(12) United States Patent
Kreidieh et al.

(10) Patent No.: US 12,112,624 B2
(45) Date of Patent: Oct. 8, 2024

(54) SYSTEMS AND METHODS FOR TRAFFIC-FLOW REGULATION VIA CENTRALIZED LATERAL FLOW CONTROL

(71) Applicant: Toyota Motor Engineering & Manufacturing North America, Inc., Plano, TX (US)

(72) Inventors: Abdul Rahman Kreidieh, Oakland, CA (US); Yashar Zeiynali Farid, Berkeley, CA (US); Kentaro Oguchi, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 198 days.

(21) Appl. No.: 17/698,305

(22) Filed: Mar. 18, 2022

(65) Prior Publication Data
US 2023/0126328 A1 Apr. 27, 2023

Related U.S. Application Data

(60) Provisional application No. 63/270,329, filed on Oct. 21, 2021.

(51) Int. Cl.
*G08G 1/01* (2006.01)
*B60W 30/18* (2012.01)
(Continued)

(52) U.S. Cl.
CPC ..... *G08G 1/0141* (2013.01); *B60W 30/18163* (2013.01); *G05B 13/0265* (2013.01);
(Continued)

(58) Field of Classification Search
CPC ......... B60W 2552/10; B60W 2556/45; B60W 30/18163; G05B 13/0265; G06N 20/00;
(Continued)

(56) References Cited

U.S. PATENT DOCUMENTS 9,015,093 B1* 4/2015 Commons .......... G01C 21/3602
706/26
9,187,088 B1* 11/2015 Ferguson ............... G06N 20/00
(Continued)

FOREIGN PATENT DOCUMENTS

| CN | 110136456 A | * | 8/2019 | |
| WO | WO-2020079074 A2 | * | 4/2020 | ............ B60W 40/04 |
| WO | WO-2021066784 A1 | * | 4/2021 | ............. G01S 19/13 |

OTHER PUBLICATIONS

J. Rios-Torres and A. A. Malikopoulos, "A survey on the coordination of connected and automated vehicles at Intersections and merging at highway on-ramps," IEEE Transactions on Intelligent Transportation Systems, vol. 18, No. 5, pp. 1066-1077, 2016.
(Continued)

*Primary Examiner* — Babar Sarwar
(74) *Attorney, Agent, or Firm* — Christopher G. Darrow; Darrow Mustafa PC

(57) ABSTRACT

Systems and methods described herein relate to traffic-flow regulation via centralized lateral flow control. One embodiment receives, at a locality manager that regulates traffic flow on a roadway via lateral flow control, aggregated macroscopic traffic state information from a section manager that communicates with one or more connected vehicles in a section of the roadway; processes the aggregated macroscopic traffic state information at the locality manager using a reinforcement-learning-based model to determine target lateral flows for two or more lanes of the roadway in the section of the roadway; and transmits the target lateral flows from the locality manager to the section manager, which converts the target lateral flows to lane-change actions and transmits the lane-change actions to the one or more connected vehicles.

20 Claims, 13 Drawing Sheets

(51) Int. Cl.
G05B 13/02 (2006.01)
G06N 7/01 (2023.01)
G08G 1/0967 (2006.01)
H04W 4/46 (2018.01)

(52) U.S. Cl.
CPC ............. *G06N 7/01* (2023.01); *G08G 1/0116* (2013.01); *G08G 1/0133* (2013.01); *G08G 1/0145* (2013.01); *G08G 1/096708* (2013.01); *G08G 1/096725* (2013.01); *G08G 1/096775* (2013.01); *G08G 1/096783* (2013.01); *H04W 4/46* (2018.02); *B60W 2552/10* (2020.02); *B60W 2556/45* (2020.02)

(58) Field of Classification Search
CPC ........ G06N 3/006; G06N 3/044; G06N 3/045; G06N 3/08; G06N 7/01; G08G 1/0112; G08G 1/0116; G08G 1/0129; G08G 1/0133; G08G 1/0141; G08G 1/0145; G08G 1/096708; G08G 1/096725; G08G 1/096775; G08G 1/096783; G08G 1/167; H04W 4/46
See application file for complete search history.

(56) References Cited

U.S. PATENT DOCUMENTS

| | | | |
|---|---|---|---|
| 11,858,536 | B1 | 1/2024 | Liu et al. |
| 2017/0276504 | A1* | 9/2017 | Lu ................... G08G 1/096816 |
| 2018/0089563 | A1* | 3/2018 | Redding ................ G06N 5/01 |
| 2018/0211529 | A1 | 7/2018 | Kaur et al. |
| 2019/0041867 | A1* | 2/2019 | Graefe ................. G05D 1/0287 |
| 2019/0274017 | A1* | 9/2019 | Wang .................. H04L 12/1854 |
| 2020/0019894 | A1* | 1/2020 | Jin ....................... G08G 1/0145 |
| 2020/0086863 | A1 | 3/2020 | Rosman et al. |
| 2021/0001857 | A1* | 1/2021 | Nishitani ............ G05D 1/0088 |
| 2021/0061294 | A1 | 3/2021 | Doemling et al. |
| 2021/0078603 | A1 | 3/2021 | Nakhaei Sarvedani et al. |
| 2021/0110708 | A1* | 4/2021 | Yang ................. G08G 1/096844 |
| 2021/0253128 | A1* | 8/2021 | Nister ..................... G06N 3/08 |
| 2021/0269040 | A1 | 9/2021 | Kurokawa et al. |
| 2021/0375127 | A1* | 12/2021 | Kalabic ................ G05D 1/0088 |
| 2022/0024476 | A1* | 1/2022 | Lund ....................... B60K 35/80 |
| 2022/0053302 | A1* | 2/2022 | Vassilovski ............. H04W 4/18 |
| 2022/0055689 | A1* | 2/2022 | Mandlekar ........ B60W 60/0025 |
| 2022/0068123 | A1* | 3/2022 | Guo ..................... G08G 1/0112 |
| 2022/0101728 | A1* | 3/2022 | Wolf ................ G08G 1/096844 |
| 2022/0138568 | A1* | 5/2022 | Smolyanskiy ......... G06N 3/044 706/21 |
| 2022/0250622 | A1* | 8/2022 | Yu ................... B60W 30/18154 |
| 2022/0332350 | A1* | 10/2022 | Jha ..................... B60W 60/0017 |
| 2023/0088324 | A1* | 3/2023 | Kumar ................. H04B 7/0617 370/329 |

OTHER PUBLICATIONS

A. R. Kreidieh, C. Wu, and A. M. Bayen, "Dissipating stop-and-go waves in closed and open networks via deep reinforcement learning," in 2018 21st International Conference on Intelligent Transportation Systems (ITSC). IEEE, 2018, pp. 1475-1480.
Y. J. Zhang, A. A. Malikopoulos, and C. G. Cassandras, "Optimal control and coordination of connected and automated vehicles at urban traffic intersections," in 2016 American Control Conference (ACC). IEEE, 2016, pp. 6227-6232.
D. Miculescu and S. Karaman, "Polling-systems-based autonomous vehicle coordination in traffic intersections with no traffic signals," IEEE Transactions on Automatic Control, vol. 65, No. 2, pp. 680-694, 2019.
S. Ahn and M. J. Cassidy, "Freeway traffic oscillations and vehicle lane-change maneuvers," Transportation and Traffic Theory, vol. 1, pp. 691-710, 2007.
J. A. Laval and C. F. Daganzo, "Lane-changing in traffic streams," Transportation Research Part B: Methodological, vol. 40, No. 3, pp. 251-264, 2006.
Z. Zheng, S. Ahn, D. Chen, and J. Laval, "Freeway traffic oscillations: microscopic analysis of formations and propagations using wavelet transform," Procedia-Social and Behavioral Sciences, vol. 17, pp. 702-716, 2011.
J. Hu, L. Kong, W. Shu, and M .- Y. Wu, "Scheduling of connected autonomous vehicles on highway lanes," in 2012 IEEE Global Communications Conference (GLOBECOM). IEEE, 2012, pp. 5556-5561.
J. Khan, P. Basaras, L. Schmidt-Thieme, A. Nanopoulos, and D. Katsaros, "Analyzing cooperative lane change models for connected vehicles," in 2014 International Conference on Connected Vehicles and Expo (ICCVE). IEEE, 2014, pp. 565-570.
A. Talebpour, H. S. Mahmassani, and S. H. Hamdar, "Modeling lane-changing behavior in a connected environment: A game theory approach," Transportatio Research Procedia, vol. 7, pp. 420-440, 2015.
M. Wang, S. P. Hoogendoorn, W. Daamen, B. van Arem, and R. Happee, "Game theoretic approach for predictive ane-changing and car-following control," Transportation Research Part C: Emerging Technologies, vol. 58, pp. 73-92, 2015.
M. Treiber and A. Kesting, "Traffic flow dynamics," Traffic Flow Dynamics: Data, Models and Simulation, Springer-Verlag Berlin Heidelberg, 2013.
Roberto C. Ambrosio-Lazaro, Luis Alberto Quezada-Tellez, Oscar A. Rosas-Jaimes, "Parameter Identification on Helly's Car-Following Model," Proceedings of 5th International Conference of Control, Dynamic systems, and Robotics, Paper No. 18, 2018.
R. Jiang, Q. Wu, and Z. Zhu, "Full velocity difference model for a car-following theory," Physical Review E, vol. 64, No. 1, p. 017101, 2001.
M. Treiber, A. Hennecke, and D. Helbing, "Congested traffic states in empirical observations and microscopic simulations," Physical review E, vol. 62, No. 2, p. 1805, 2000.
M. Bando, K. Hasebe, A. Nakayama, A. Shibata, and Y. Sugiyama, "Dynamical model of traffic congestion and numerical simulation," Physical review E, vol. 51, No. 2, p. 1035, 1995.
P. G. Gipps, "A model for the structure of lane-changing decisions," Transportation Research Part B: Methodological, vol. 20, No. 5, pp. 403-414, 1986.
A. Kesting, M. Treiber, and D. Helbing, "General lane-changing model mobil for car-following models," Transportation Research Record, vol. 1999, No. 1, pp. 86-94, 2007.
W. J. Schakel, V. L. Knoop, and B. van Arem, "Integrated lane change model with relaxation and synchronization," Transportation Research Record, vol. 2316, No. 1, pp. 47-57, 2012.
J. Erdmann, "Sumo's lane-changing model," in Modeling Mobility with Open Data. Springer, 2015, pp. 105-123.
M. Fellendorf and P. Vortisch, "Microscopic traffic flow simulator vissim," in Fundamentals of traffic simulation. Springer, 2010, pp. 63-93.
V. Milanes, S. E. Shladover, J. Spring, C. Nowakowski, H. Kawazoe, and M. Nakamura, "Cooperative adaptive cruise control in real traffic situations," IEEE Transactions on intelligent transportation systems, vol. 15, No. 1, pp. 296-305, 2013.
R. E. Stern, S. Cui, M. L. Delle Monache, R. Bhadani, M. Bunting, M. Churchill, N. Hamilton, H. Pohlmann, F. Wu, B. Piccoli et al., "Dissipation of stop-and-go waves via control of autonomous vehicles: Field experiments," Transportation Research Part C: Emerging Technologies, vol. 89, pp. 205-221, 2018.
M. J. Lighthill and G. B. Whitham, "On kinematic waves ii. a theory of traffic flow on long crowded roads," Proceedings of the Royal Society of London. Series A. Mathematical and Physical Sciences, vol. 229, No. 1178, pp. 317-345, 1955.
P. I. Richards, "Shock waves on the highway," Operations research, vol. 4, No. 1, pp. 42-51, 1956.
Vasilka Stoilova, Emil Nikolov, Nina Nikolova, "Analytical Deriving of Second Order Model of Payne from First Order Lighthil-Whitham-Richards Model," Cybernetics and Information Technologies, vol. 13, No. 4, 2013.

(56) References Cited

OTHER PUBLICATIONS

A. Aw and M. Rascle, "Resurrection of 'second order" models of traffic flow," SIAM journal on applied mathematics, vol. 60, No. 3, pp. 916-938, 2000.
H. M. Zhang, "A non-equilibrium traffic model devoid of gas-like behavior," Transportation Research Part B: Methodological, vol. 36, No. 3, pp. 275-290, 2002.
W.-L. Jin, "A multi-commodity lighthill-whitham-richards model of lane-changing traffic flow," Procedia-Social and Behavioral Sciences, vol. 80, pp. 658-677, 2013.
C. Roncoli, M. Papageorgiou, and I. Papamichail, "Traffic flow optimisation in presence of vehicle automation and communication systems-part i: A first-order multi-lane model for motorway traffic," Transportation Research Part C: Emerging Technologies, vol. 57, pp. 241-259, 2015.
C. Roncoli, M. Papageorgiou, and I. Papamichail, "Traffic flow optimisation in presence of vehicle automation and communication systems-part ii: Optimal control for multi-lane motorways," Transportation Research Part C: Emerging Technologies, vol. 57, pp. 260-275, 2015.
C. Roncoli, N. Bekiaris-Liberis, and M. Papageorgiou, "Optimal lane-changing control at motorway bottlenecks," in 2016 IEEE 19th International Conference on Intelligent Transportation Systems (ITSC). IEEE, 2016, pp. 1785-1791.
C. Roncoli, N. Bekiaris-Liberis, and M. Papageorgiou, "Lane-changing feedback control for efficient lane assignment at motorway bottlenecks," Transportation Research Record, vol. 2625, No. 1, pp. 20-31, 2017.
R. Bellman, "A markovian decision process," Journal of mathematics and mechanics, vol. 6, No. 5, pp. 679-684, 1957.
T. Shi, P. Wang, X. Cheng, C.-Y. Chan, and D. Huang, "Driving decision and control for automated lane change behavior based on deep reinforcement learning," in 2019 IEEE intelligent transportation systems conference (ITSC). IEEE, 2019, pp. 2895-2900.
P. Wang, C.-Y. Chan, and A. de La Fortelle, "A reinforcement learning based approach for automated lane change maneuvers," in 2018 IEEE Intelligent Vehicles Symposium (IV). IEEE, 2018, pp. 1379-1384.
H. An and J.-i. Jung, "Decision-making system for lane change using deep reinforcement learning in connected and automated driving," Electronics, vol. 8, No. 5, p. 543, 2019.
B. Mirchevska, C. Pek, M. Werling, M. Althoff, and J. Boedecker, "High-level decision making for safe and reasonable autonomous lane changing using reinforcement learning," in 2018 21st International Conference on Intelligent Transportation Systems (ITSC). IEEE, 2018, pp. 2156-2162.
C.-J. Hoel, K. Wolff, and L. Laine, "Automated speed and lane change decision making using deep reinforcement learning," in 2018 21st International Conference on Intelligent Transportation Systems (ITSC). IEEE, 2018, pp. 2148-2155.

M. Mukadam, A. Cosgun, A. Nakhaei, and K. Fujimura, "Tactical decision making for lane changing with deep reinforcement learning," 2017.
J. Yang, A. Nakhaei, D. Isele, K. Fujimura, and H. Zha, "Cm3: Cooperative multi-goal multi-stage multi-agent reinforcement learning," arXiv preprint arXiv:1809.05188, 2018.
G. Wang, J. Hu, Z. Li, and L. Li, "Cooperative lane changing via deep reinforcement learning," arXiv preprint arXiv:1906.08662, 2019.
R. L. Bertini and M. T. Leal, "Empirical study of traffic features at a freeway lane drop," Journal of Transportation Engineering, vol. 131, No. 6, pp. 397-407, 2005.
S. Fujimoto, H. Hoof, and D. Meger, "Addressing function approximation error in actor-critic methods," in International Conference on Machine Learning. PMLR, 2018, pp. 1587-1596.
B. Wolfe, B. Seppelt, B. Mehler, B. Reimer, and R. Rosenholtz, "Rapid holistic perception and evasion of road hazards." Journal of experimental psychology: general, vol. 149, No. 3, p. 490, 2020.
A. Kreidieh et al., "Inter-Level Cooperation in Hierarchical Reinforcement Learning," arXiv:1912.02368v2 [cs.LG] Aug. 25, 2020, found at https://arxiv.org/pdf/1912.02368.pdf.
J. Duan et al., "Hierarchical Reinforcement Learning for Self-Driving Decision-Making without Reliance on Labeled Driving Data," arXiv:2001.09816v1 [eess.SY], Jan. 27, 2020, found at https://arxiv.org/pdf/2001.09816.pdf.
A. Singh et al., "Hierarchical Multiagent Reinforcement Learning for Maritime Traffic Management," Research Collection School of Computing and Information Systems, Singapore Management University, 2020, found at https://ink.library.smu.edu.sg/cgi/viewcontent.cgi?article=6406&context=sis_research.
E. Walraven et al., "Traffic Flow Optimization: A Reinforcement Learning Approach," Engineering Applications of Artificial Intelligence 52 (2016), pp. 203-212, found at https://booksc.eu/dl/53916052/b4ead6.
M. Ramezani et al. "Lane density optimisation of automated vehicles for highway congestion control." Transportmetrica B: Transport Dynamics, found at https://doi.org/10.1080/21680566.2019.1568925.
E. Lovellette et al., "Lane and Speed Allocation Mechanism for Autonomous Vehicle Agents on a Multi-Lane Highway," Internet of Things 13 (2021), found at https://reader.elsevier.com/reader/sd/pii/S2542660520301876?token=BBCF7096EC54E88A9A986EADE90A0F3431B0FCB3E11A97C66F947462E70C56E90FADD101D93235795CCA1AABA9E53D73&originRegion=US-east-1&originCreation=20210909163520.
F. Ye et al., "Automated Lane Change Strategy Using Proximal Policy Optimization-Based Deep Reinforcement earning," arXiv:2002.02667v2 [cs.LG], May 20, 2020, available at https://arxiv.org/pdf/2002.02667.pdf.
S. Aradi, "Survey of Deep Reinforcement Learning for Motion Planning of Autonomous Vehicles," IEEE Transactions on Intelligent Transportation Systems, 2020, available at https://ieeexplore.IEEE.org/stamp/stamp.jsp? arnumber=9210154.

\* cited by examiner

| Vehicle ID | Fitness | | Vehicle ID | Fitness |
|---|---|---|---|---|
| 3 | 207.7 m | | 3 | 231.7 m |
| 1 | 134.5 m | | 2 | 122.5 m |
| 4 | 113.2 m | | 1 | 89.2 m |
| 2 | 93.2 m | | 4 | 78.6 m |

910 · 1005

| Vehicle ID | Fitness | | Vehicle ID | Fitness |
|---|---|---|---|---|
| 3 | 207.7 m | | 3 | 231.7 m |
| 1 | 134.5 m | | 2 | 122.5 m |
| 4 | 113.2 m | | 1 | 89.2 m |
| 2 | 93.2 m | | 4 | 78.6 m |

910 · 1005

| Solution | Fitness (left) | Fitness (right) |
|---|---|---|
| (1,2), (3,4) | 134.5 + 93.2 | 231.7 + 78.6 |
| (1,3), (2,4) | 134.5 + 207.7 | 122.5 + 78.6 |
| ... | ... | ... |

1010

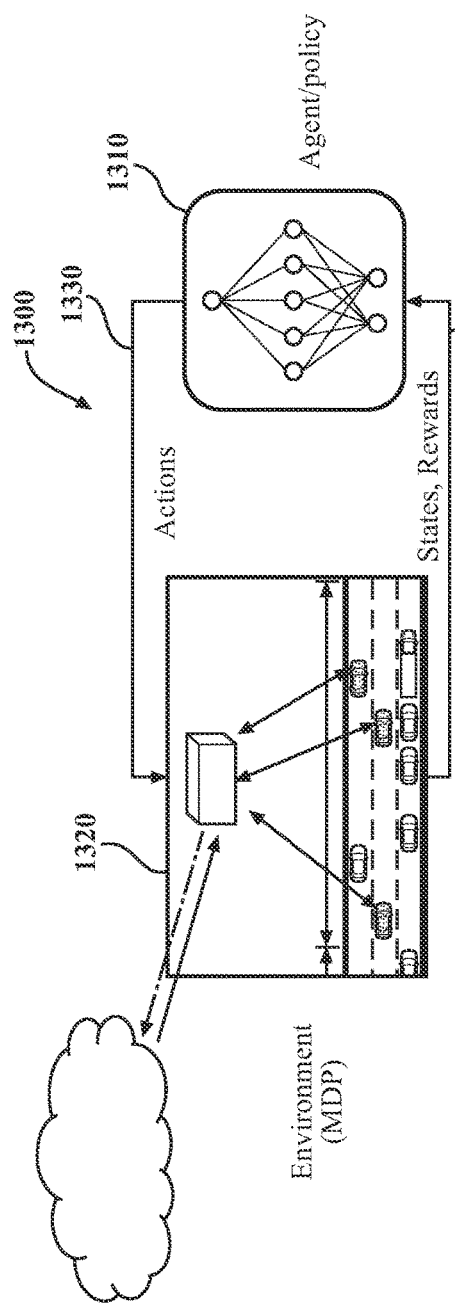
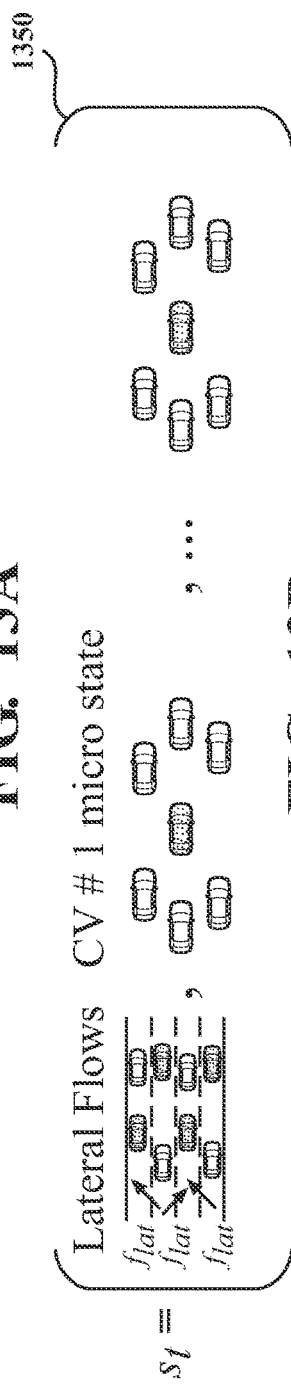
FIG. 13A
FIG. 13B
FIG. 13C

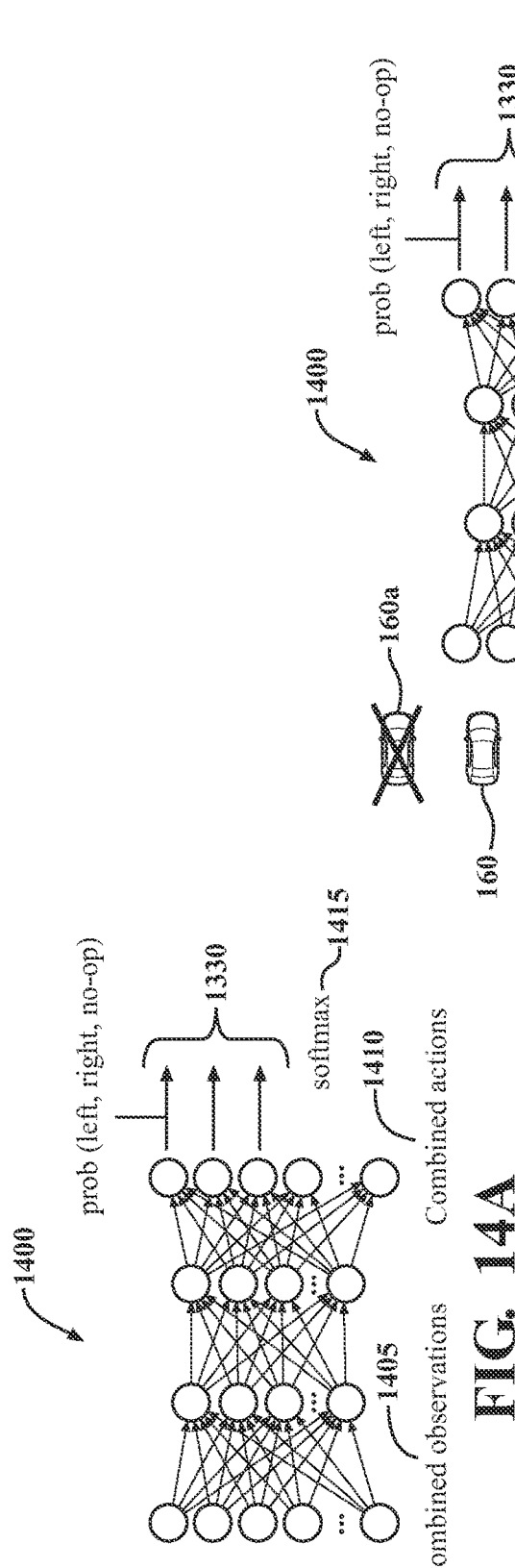
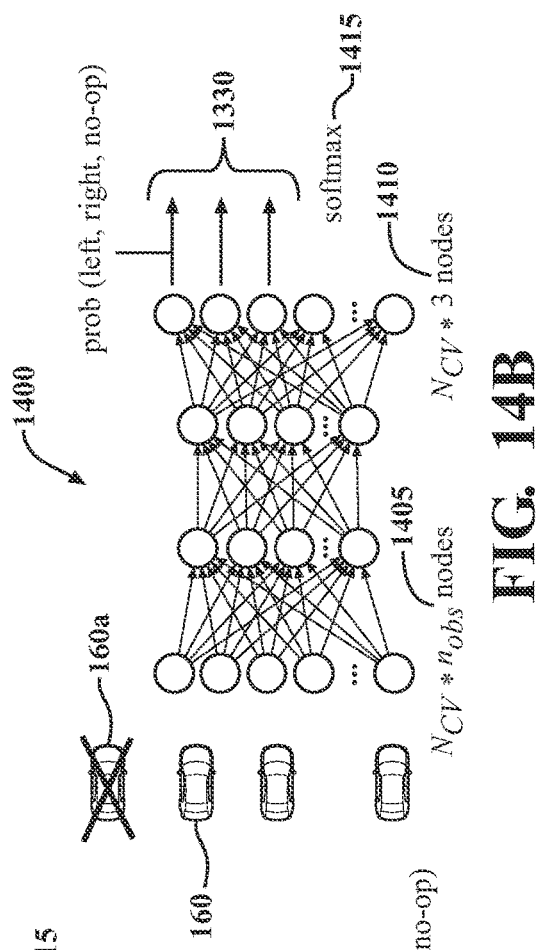
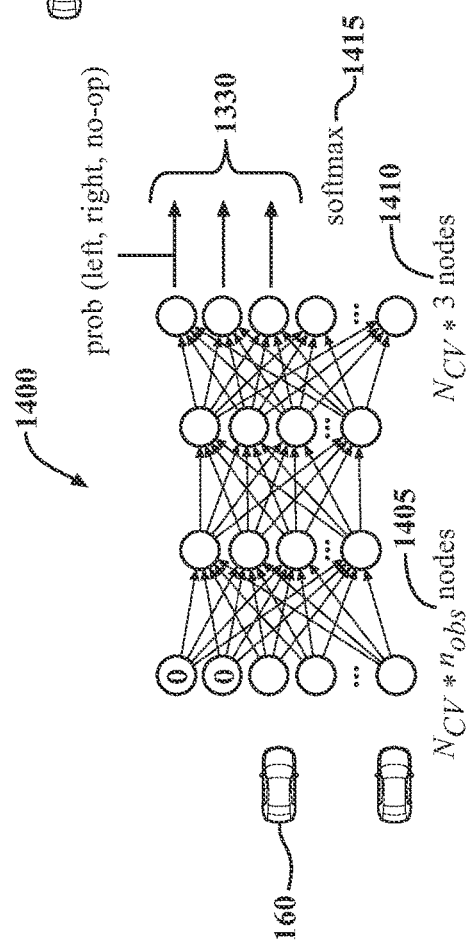
FIG. 14A
FIG. 14B
FIG. 14C

SYSTEMS AND METHODS FOR TRAFFIC-FLOW REGULATION VIA CENTRALIZED LATERAL FLOW CONTROL

CROSS-REFERENCE TO RELATED APPLICATION

This application claims the benefit of U.S. Provisional Patent Application No. 63/270,329, "Systems and Methods for Macroscopic Traffic Flow Optimization with Microscopic Vehicle Lane Assignment," filed on Oct. 21, 2021, which is incorporated by reference herein in its entirety.

TECHNICAL FIELD

The subject matter described herein relates in general to vehicle traffic flow regulation systems and, more specifically, to systems and methods for traffic-flow regulation via centralized lateral flow control.

BACKGROUND

Coordinated lane-assignment strategies present promising strategies for improving the flow of vehicular traffic to alleviate traffic congestion. These strategies can be applied to both connected (network-enabled) manually driven vehicles and to connected autonomous vehicles. By anticipating and repositioning vehicles in response to potential downstream congestion, such systems can greatly improve the safety and efficiency of traffic flow, even when only a small percentage of the vehicles on the roadway are connected vehicles. Designing systems that can achieve such regulation under practical real-world conditions, however, continues to be a challenging problem. For example, centralized lane-assignment strategies may not be scalable due to the curse of dimensionality. Also, the rate of execution and communication latency in a centralized system can be major concerns.

SUMMARY

Embodiments of a system for traffic-flow regulation via centralized lateral flow control are presented herein. In one embodiment, the system comprises a processor and a memory storing machine-readable instructions that, when executed by the processor, cause the processor to receive aggregated macroscopic traffic state information from a section manager that communicates with one or more connected vehicles in a section of a roadway. The memory also stores machine-readable instructions that, when executed by the processor, cause the processor to process the aggregated macroscopic traffic state information using a reinforcement-learning-based model to determine target lateral flows for two or more lanes of the roadway in the section of the roadway. The memory also stores machine-readable instructions that, when executed by the processor, cause the processor to transmit the target lateral flows to the section manager, which converts the target lateral flows to lane-change actions and transmits the lane-change actions to the one or more connected vehicles.

Another embodiment is a non-transitory computer-readable medium for traffic-flow regulation via centralized lateral flow control and storing instructions that, when executed by a processor, cause the processor to receive aggregated macroscopic traffic state information from a section manager that communicates with one or more connected vehicles in a section of a roadway. The instructions also cause the processor to process the aggregated macroscopic traffic state information using a reinforcement-learning-based model to determine target lateral flows for two or more lanes of the roadway in the section of the roadway. The instructions also cause the processor to transmit the target lateral flows to the section manager, which converts the target lateral flows to lane-change actions and transmits the lane-change actions to the one or more connected vehicles.

Another embodiment is a method of traffic-flow regulation via centralized lateral flow control, the method comprising receiving, at a locality manager that regulates traffic flow on a roadway via lateral flow control, aggregated macroscopic traffic state information from a section manager that communicates with one or more connected vehicles in a section of the roadway. The method also includes processing the aggregated macroscopic traffic state information at the locality manager using a reinforcement-learning-based model to determine target lateral flows for two or more lanes of the roadway in the section of the roadway. The method also includes transmitting the target lateral flows from the locality manager to the section manager, which converts the target lateral flows to lane-change actions and transmits the lane-change actions to the one or more connected vehicles.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 13A is a diagram of a Markov Decision Process model in a section manager, in accordance with an illustrative embodiment of the invention.

FIG. 13B is a diagram showing states of a Markov Decision Process model in a section manager, in accordance with an illustrative embodiment of the invention.

FIG. 13C is a diagram illustrating connected-vehicle actions of a Markov Decision Process model in a section manager, in accordance with an illustrative embodiment of the invention.

FIG. 14A illustrates a neural network employed in a Markov Decision Process model in a section manager, in accordance with an illustrative embodiment of the invention.

FIG. 14B illustrates a situation in which the number of connected vehicles in a section exceeds the number of observation nodes in a neural network, in accordance with an illustrative embodiment of the invention.

FIG. 14C illustrates a situation in which the number of observation nodes in a neural network exceeds the number of connected vehicles in a section, in accordance with an illustrative embodiment of the invention.

DETAILED DESCRIPTION

Various embodiments of systems and methods for hierarchical traffic-flow regulation described herein overcome the limitations of conventional traffic-flow regulation systems. These embodiments employ a hierarchical paradigm that couples the tractability of macroscopic lane-assignment models with the safety and vehicle-level considerations of microscopic lane-assignment models. One example of this hierarchical paradigm is illustrated in FIG. 1.

Figure 1:
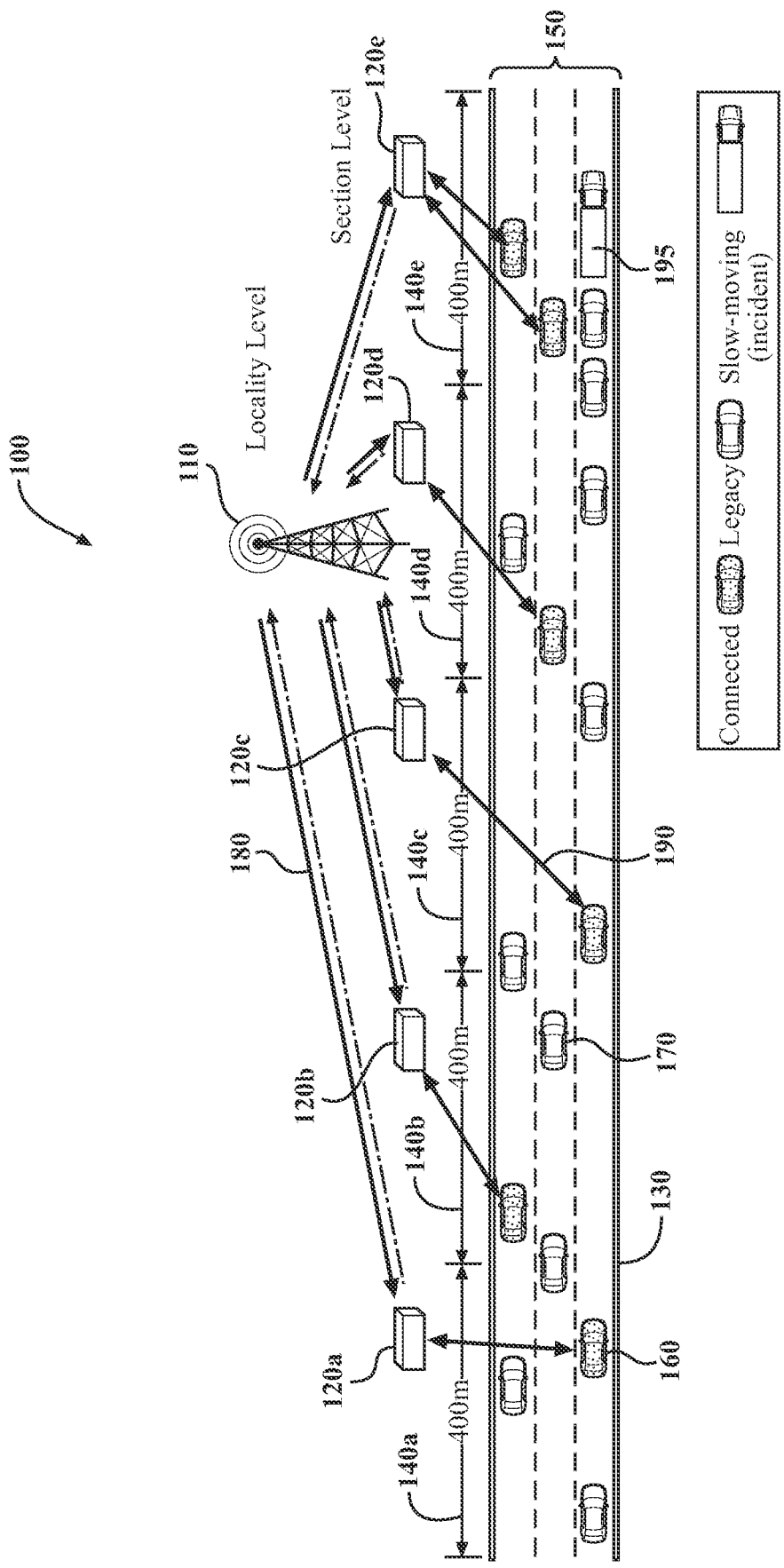
FIG. 1 is an architecture diagram of a hierarchical traffic-flow regulation system, in accordance with an illustrative embodiment of the invention.

FIG. 1 is an architecture diagram of a hierarchical traffic-flow regulation system, in accordance with an illustrative embodiment of the invention. As shown in FIG. 1, the architecture 100 includes a roadway 130 having multiple lanes 150. The three lanes 150 shown in FIG. 1 are illustrative. In other embodiments, roadway 130 may have only two lanes, or it may have more than three lanes. The roadway 130 is divided longitudinally into a plurality of sections such as sections 140a-e shown in FIG. 1. Though FIG. 1 indicates that each section is 400 m in length, this is merely one example. The sections 140 can be smaller than 400 m or larger, depending on the embodiment. Also, the depiction of five sections (140a-e) in FIG. 1 is also merely illustrative. In some embodiments, a given locality manager 110 (discussed below) can serve more or fewer than five sections 140.

As shown in FIG. 1, each of the roadway sections 140a-e is served by a section manager 120. The section managers 120a-e collectively constitute a section level of the architecture 100. The section manager 120 of a given section 140 communicates with one or more connected vehicles 160 in that section over communication links 190. As shown in FIG. 1, a given section 140 can also include one or more legacy (non-connected) vehicles 170. The section managers 120a-e receive vehicle-dynamics and traffic-state information from the connected vehicles 160 in their respective sections 140. Such data can include reports of vehicle positions, velocities, and measured distances among vehicles on the roadway 130. In some embodiments, at least some of the connected vehicles 160 are autonomous (self-driving) vehicles that operate at what the automotive industry refers to as autonomy Levels 3-5.

A locality manager 110 at a locality level of architecture 100 processes aggregated macroscopic traffic state information received from the section managers 120a-e via communication links 180 to determine target lateral flows (movement to the left and/or right) for the lanes 150 in the sections 140a-e of roadway 130. In some embodiments, locality manager 110 processes the aggregated macroscopic traffic state information using a reinforcement-learning (RL)-based model to produce the target lateral flows. In determining the target lateral flows, the RL-based model in the locality manager 110 can take into account information pertaining to a slow-moving or stopped vehicle 195 (an "incident"). Such an incident can have a negative impact on traffic flow and lead to traffic jams. The locality manager 110 transmits the target lateral flows to the section managers 120a-e, which (1) convert the target laterals flows to lane-change actions for their respective sections 140a-e and (2) transmit the lane-change actions to the connected vehicles 160 in their respective sections 140a-e. An autonomous connected vehicle 160 can automatically carry out the received lane-change action. The driver of a manually driven connected vehicle 160 can voluntarily comply with the received lane-change action based on the driver's prior agreement to cooperate with lane-change actions received from the hierarchical traffic-flow regulation system.

How the section managers 120a-e convert the target lateral flows received from the locality manager 110 to lane-change actions for specific connected vehicles 160 differs, depending on the embodiment. In some embodiments, the section managers 120a-e employ a heuristic algorithm that ranks connected vehicles 160 in a given section 140 in accordance with the measured distances to their respective following vehicles in the target (new) lane 150. In other embodiments, the section managers 120a-e employ a RL-based model to determine specific lane-change actions for the connected vehicles in their respective sections 140a-e.

As FIG. 1 illustrates, the architecture 100 is hierarchical in that high-level actions (target lateral flows) are determined by the locality manager 110 and assigned to section managers 120, ensuring coordination among the sections 140. The section managers 120, at a lower level of the hierarchy closer to the connected vehicles 160, convert the lateral flows to specific lane-change actions and transmit the lane-change actions to the connected vehicles 160 in their respective sections 140. This hierarchical architecture 100 overcomes communication/latency concerns by assigning target lateral flows to section managers 120 at a relatively lower frequency than the frequency at which the section managers 120 assign lane-change actions to the connected vehicles 160. For example, in one embodiment, locality manager 110 transmits assigned target lateral flows to the section managers 120 every 30 seconds, and the section managers 120 transmit lane-change actions to the connected vehicles 160 in their respective sections 140 every 5 seconds. In other embodiments, these time intervals may be different.

In some embodiments, locality manager 110 serves a geographical area corresponding to a neighborhood or subdivision. In other embodiments, locality manager 110 may serve a geographical area or segment of roadway 130 that is larger or smaller than a neighborhood/subdivision.

Compared with conventional centralized controllers, the architecture 100 discussed above provides marked improvements in moderate- and high-demand settings, the hierarchical traffic-flow regulation system particularly benefitting the mobility of connected vehicles 160 in high-demand settings in which dense traffic jams tend to form.

The remainder of this Detailed Description is organized as follows. First, an embodiment of a locality manager 110 is described in detail. Second, an embodiment of a heuristic-ranking-algorithm-based section manager 120 is described in detail. Finally, an embodiment of a RL-based section manager 120 is described in detail.

Locality Manager

Figure 2:
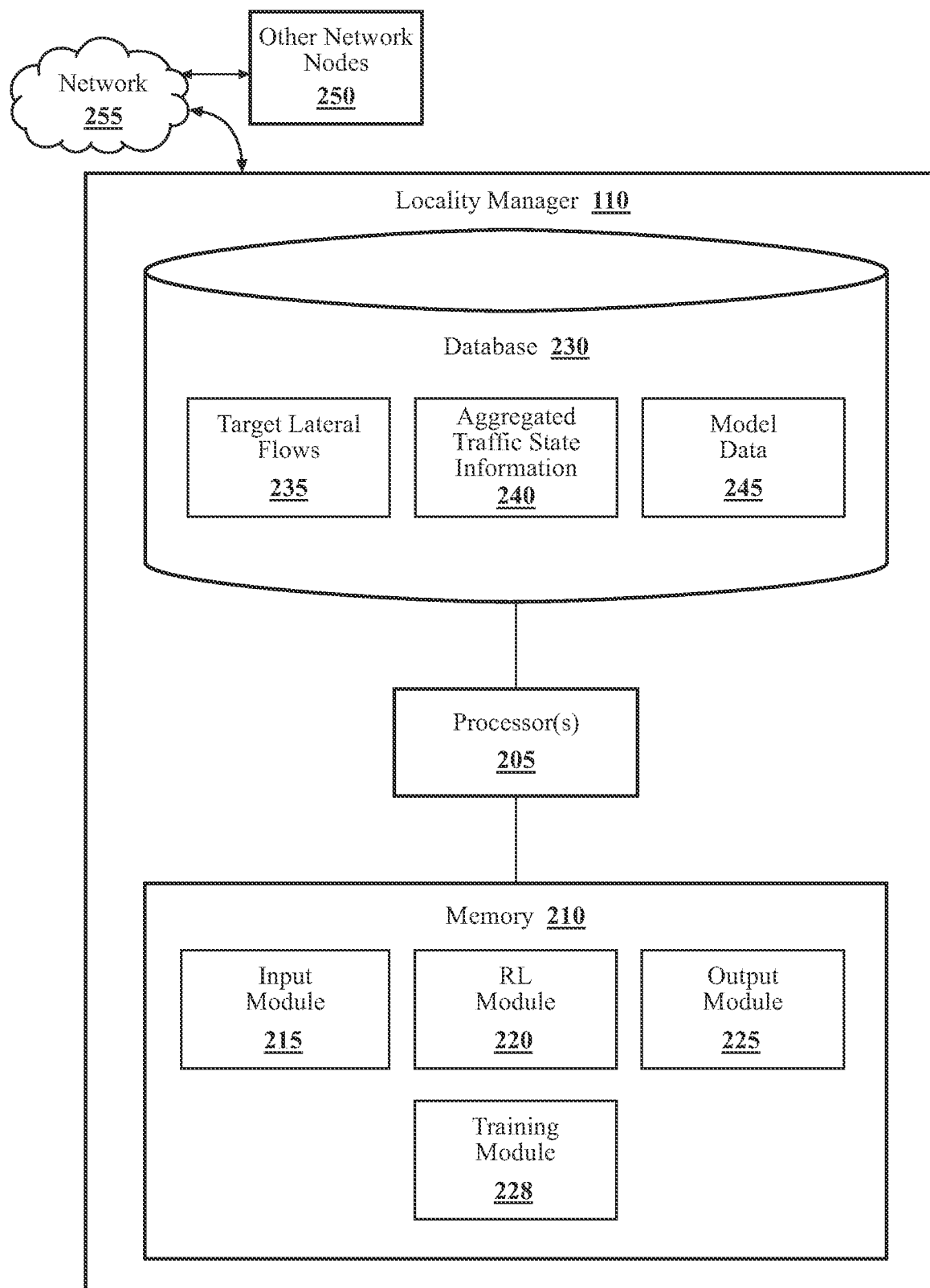
FIG. 2 is a block diagram of a locality manager, in accordance with an illustrative embodiment of the invention.

FIG. 2 is a block diagram of a locality manager 110, in accordance with an illustrative embodiment of the invention. In FIG. 2, locality manager 110 includes one or more processors 205 to which a memory 210 is communicably coupled. More specifically, in this embodiment, memory 210 stores an input module 215, a reinforcement-learning (RL) module 220, an output module 225, and a training module 228. The memory 210 is a random-access memory (RAM), read-only memory (ROM), a hard-disk drive, a flash memory, or other suitable non-transitory memory for storing the modules 215, 220, 225, and 228. The modules 215, 220, 225, and 228 are, for example, machine-readable instructions that, when executed by the one or more processors 205, cause the one or more processors 205 to perform the various functions disclosed herein.

As shown in FIG. 2, locality manager 110 can store various kinds of data in a database 230. For example, locality manager 110 can store target lateral flows 235, aggregated traffic state information 240, and model data 245. Model data 245 can include a variety of different kinds of data associated with a RL-based model, such as hyperparameters, parameters, neural-network weights, attractiveness terms (explained below), the results of intermediate calculations, etc.

As shown in FIG. 2, locality manager 110 can communicate with other network nodes 250 (section managers 120, servers, roadway infrastructure, etc.) via a network 255. In some embodiments, network 255 includes the Internet. In communicating with other network nodes 250, locality manager 110 can make use of communication technologies such as high-speed Ethernet, fiber-optic connections, cellular data (LTE, 5G, 6G, etc.), Dedicated Short-Range Communications (DSRC), Bluetooth Low Energy (LE), etc.

Input module 215 generally includes instructions that, when executed by the one or more processors 205, cause the one or more processors 205 to receive aggregated macroscopic traffic state information 240 from a section manager 120 that communicates with one or more connected vehicles 160 in a section 140 of a roadway 130. The specific components making up the aggregated traffic state information 240 are identified and discussed below in connection with FIG. 3.

Figure 3:
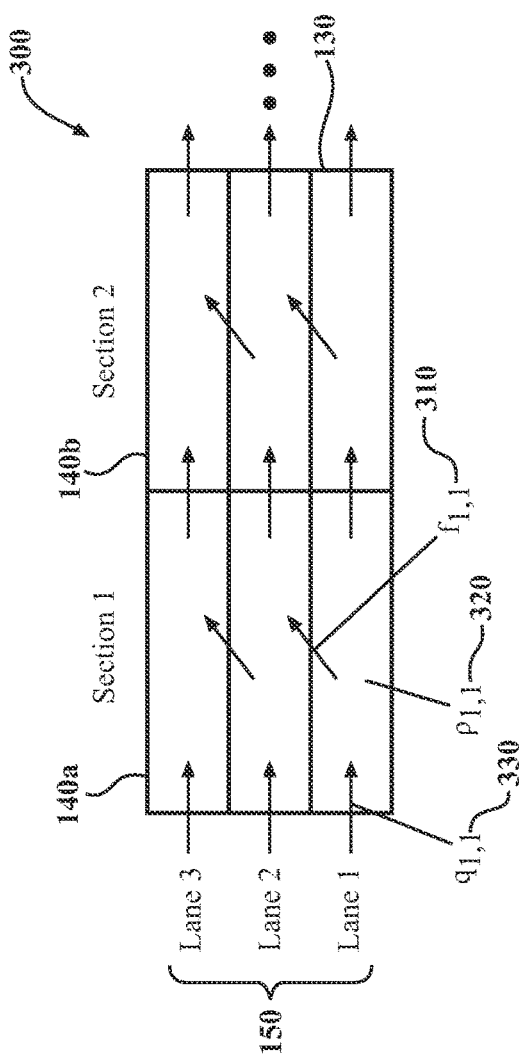
FIG. 3 is a diagram of roadway sections, lanes, and traffic-flow parameters, in accordance with an illustrative embodiment of the invention.

FIG. 3 is a diagram of roadway sections 140, lanes 150, and traffic-flow parameters, in accordance with an illustrative embodiment of the invention. FIG. 3 diagrams two sections 140 of roadway 130 to illustrate the aggregated traffic state information 240. In accordance with a macroscopic-traffic-flow formulation of the problem, the aggregated traffic state information 240, in this embodiment, includes (1) the density of section i, lane j, $\rho_{i,j}$, defined as the number of vehicles in section i, lane j, at time k divided by the section length $L_i$; (2) the longitudinal flow to section i, lane j, $q_{i,j}$, defined as the traffic volume leaving section i and entering section i+1 during interval (k, k+1], thus remaining in lane j; and (3) the net lateral flow from lane j to lane j+1 in section i, $f_{i,j}$, defined as the traffic volume moving from lane j to lane j+1 but remaining in the same section 140 during the current time interval. In FIG. 3, $\rho_{1,1}$ (320), $q_{1,1}$ (330), and $f_{1,1}$ (310) are labeled for Lane 1 of Section 1 as an example. Note that the foregoing definition of lateral flow $f_{i,j}$ and the scenario depicted in FIG. 3 assume that lateral flows are to the left (from a lower-numbered lane to a higher-numbered lane in FIG. 3). In other embodiments, lateral flow to both the left and the right (from higher-numbered lanes to lower-numbered lanes in FIG. 3) are considered, as discussed further below.

RL module 220 generally includes instructions that, when executed by the one or more processors 205, cause the one or more processors 205 to process the aggregated macroscopic traffic state information 240 using a RL-based model to determine target lateral flows 235 for two or more lanes 150 of the roadway 130 in the section 140 of the roadway 130. In this embodiment, the problem of determining target (aspirational) lateral flows is formulated as a Markov Decision Process (MDP). In some embodiments, the MDP includes (1) system states in terms of macroscopic flow/density for both the entire roadway network and the connected vehicles 160, in particular; (2) actions defined in terms of desired lateral flow between lanes 150 in each section 140; (3) reward functions based on the average speed of connected vehicles 160 and the average speed of all vehicles (connected and legacy); and (4) transition dynamics, which includes car-following, lane-changing, and section-level control. A MDP model is discussed in greater detail below in connection with FIG. 4.

Figure 4:
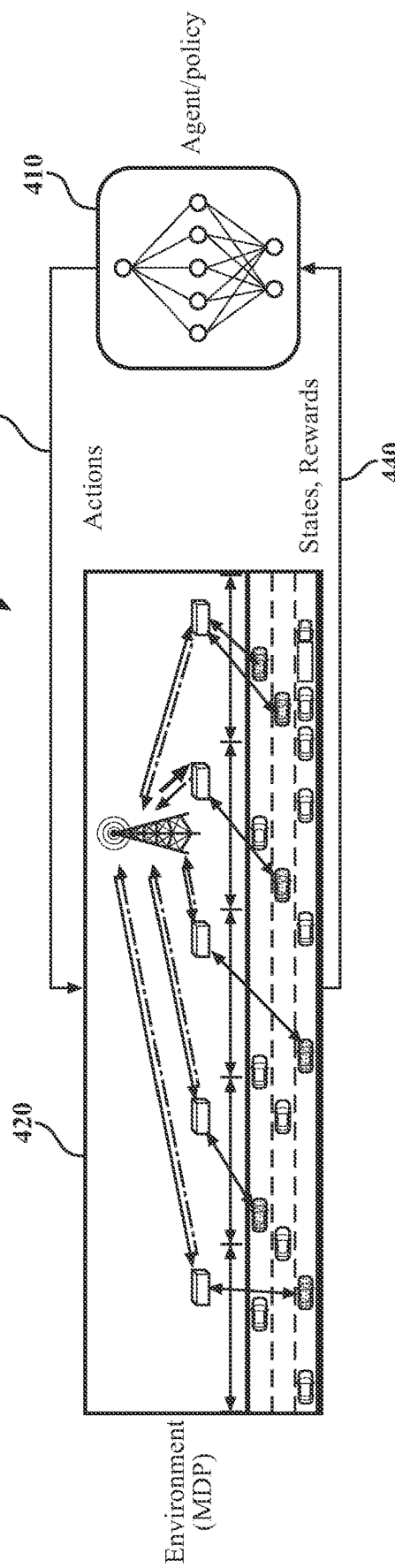
FIG. 4 is a diagram of a reinforcement-learning-based Markov Decision Process model in a locality manager, in accordance with an illustrative embodiment of the invention.

FIG. 4 is a diagram of a RL-based MDP model 400 (hereinafter "RL-based model 400") in a locality manager 110, in accordance with an illustrative embodiment of the invention. As shown in FIG. 4, RL-based model 400 includes an agent 410 based on one or more neural networks and an associated policy, MDP environment 420, actions 430, and states and rewards 440. In this embodiment, the MDP is expressed mathematically as the following tuple: ($\mathcal{S}$, $\mathcal{A}$, $\mathcal{P}$, r, $\rho_0$, $\gamma$, T), where $\mathcal{S} \subseteq \mathbb{R}^n$ is an n-dimensional state space, $\mathcal{A} \subseteq \mathbb{R}^m$ is an m-dimensional action space, $\mathcal{P}: \mathcal{S} \times \mathcal{A} \times \mathcal{S} \to \mathbb{R}_+$ is a transition probability function, r: $\mathcal{S} \to \mathbb{R}$ is a bounded reward function, $\rho_0: \mathcal{S} \to \mathbb{R}_+$ is an initial state distribution, $\gamma \in (0, 1]$ is a discount factor, and T is a time horizon. In the MDP, an agent 410 is in a state $s_t \in \mathcal{S}$ in the environment 420 and interacts with the environment 420 by performing actions $a_t \in \mathcal{A}$ (430) (i.e., outputting target lateral flows 235). The agent's actions 430, in this embodiment, are defined by a policy $\pi_\theta: \mathcal{S} \times \mathcal{A} \to \mathbb{R}_+$ parameterized by $\theta$. The objective of the agent 410 is to learn an optimal policy $\theta^* := \text{argmax}_\theta \eta(\pi_\theta)$, where $\eta(\pi_\theta) = \Sigma_{i=0}^T \gamma^i r_i$ is the expected discounted return. Various parameters in the tuple discussed above are discussed in greater detail below.

Figure 5:
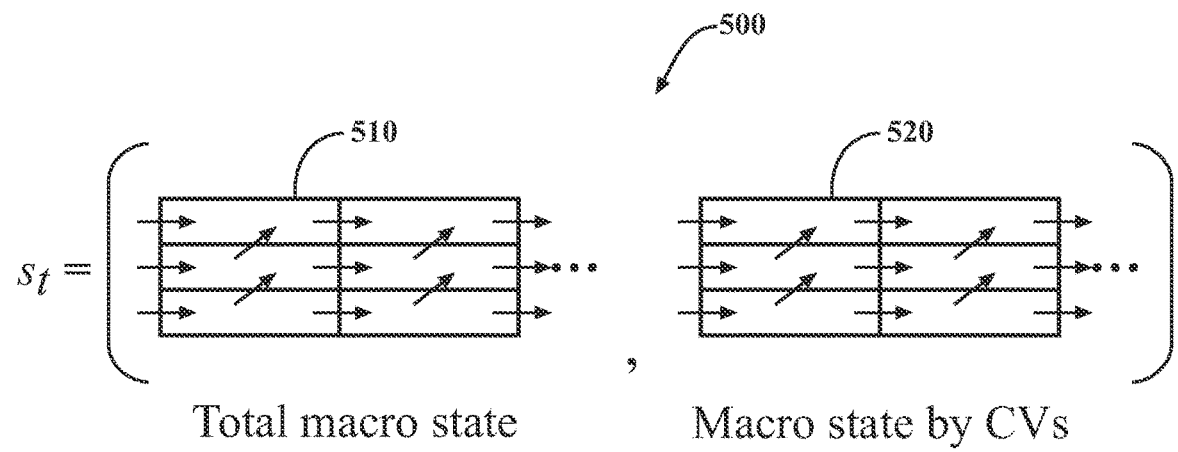
FIG. 5 is a diagram showing states of a Markov Decision Process model in a locality manager, in accordance with an illustrative embodiment of the invention.

Regarding the states $\mathcal{S}$, in the embodiment of FIG. 4, a macroscopic depiction of the state space is considered, as discussed above. This includes densities $\rho_{i,j}$ for section i and lane j and longitudinal flow $q_{i,j}$ into section i and lane j. In some embodiments, observed lateral flows $f_{i,j}$ are omitted to avoid problems with overfitting and/or causal confusion. The aggregated traffic state information 240 does not reveal the states of individual connected vehicles 160, however, which makes it difficult to determine how the connected vehicles 160 are doing (on average) and which sections are actually under the control of the locality manager 110 at a particular point in time. This is resolved by including, in the observation space, the macroscopic states of the connected vehicles 160, which results in the final observation space illustrated in FIG. 5. As indicated by the diagram 500 in FIG. 5, the final observation space includes both the total macroscopic state 510 and the macroscopic state by connected vehicles 160 (520).

Figure 6:
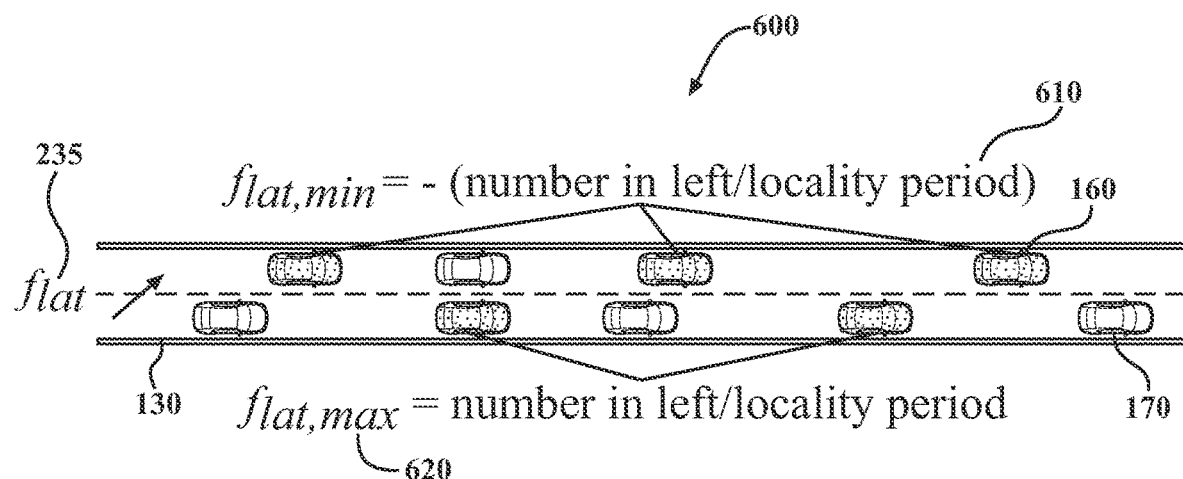
FIG. 6 is a diagram illustrating how bounds on lateral flow are determined, in accordance with an illustrative embodiment of the invention.

Regarding the actions $\mathcal{A}$, learning pure lateral flows can be challenging because the system has to learn what flows are reasonable, and assigning large/unachievable flows flattens the gradients during the optimization procedure. To resolve this issue, in some embodiments, certain desirable lateral-flow bounds are defined, as illustrated in FIG. 6. As indicated by the diagram 600 in FIG. 6, a lateral flow minimum 610 can be defined as $$f_{lat,min} = -\left(\frac{\text{number in left}}{\text{locality period}}\right),$$

and a lateral flow maximum 620 can be defined as $$f_{lat,max} = \frac{\text{number in right}}{\text{locality period}}.$$

The agent 410 (e.g., one or more neural networks), in some embodiments, outputs an attractiveness term $a_{i,j} \in \{0,1\}$ for each section and lane. Given the above definitions, target lateral flows 235 for the various sections and lanes can then be computed as follows: $f_{lat} = f_{lat,min} + (f_{lat,max} - f_{lat,min}) \cdot a_{i,j}$.

Regarding the reward function r, in some embodiments, it is an objective to produce positive societal impacts through a hierarchical traffic-flow regulation system. The reward function, thus, balances societal impact with personal benefit to the connected vehicles 160. In some embodiments, the reward function is defined as $r_t = v_{avg,CV} + \gamma \cdot v_{avg}$, where $v_{avg,CV}$ is the average speed of the connected vehicles 160, $v_{avg}$ is the average speed of all vehicles (connected and legacy), and $\gamma$ (the discount factor discussed above) captures the relevance of societal impact in a particular implementation. In some embodiments, $\gamma$ is set to unity, which corresponds to all vehicles, whether connected or legacy, being treated as equally important. In a different embodiment, setting $\gamma$ to zero results in RL module 220 focusing entirely on improving the performance of the connected vehicles 160. In yet another embodiment, $\gamma$ is set to 0.99.

Regarding the transition probability function $\mathcal{P}$, as discussed above, this is based on factors such as car-following and lane-changing dynamics and section-manager dynamics. Regarding the initial state distribution $\rho_0$, this can take into account the initial positions/speeds of both connected vehicles 160 and legacy vehicles 170 and the position/lane of an incident 195 (e.g., a slow-moving or stalled vehicle). An incident 195 can also involve a lane closure (e.g., due to road construction or an accident) or other condition that interferes with the normal flow of vehicular traffic. The time horizon T varies, depending on the embodiment. In a simulation context (e.g., during training of the RL-based model 400 and subsequent testing), a total simulation time of 1200 s in increments of 0.25 steps/s is used, in one embodiment.

Training module 228 generally includes instructions that, when executed by the one or more processors 205, cause the one or more processors 205 to train the RL-based model 400. The training algorithm selected depends on the particular embodiment, but some choices known to those skilled in the art include the DQN, TRPO, and DDPG/TD3 algorithms published in the literature. In one embodiment, training module 228 uses TD3 as the training algorithm with standard hyperparameters and two hidden layers of size 256 each.

Output module 225 generally includes instructions that, when executed by the one or more processors 205, cause the one or more processors 205 to transmit the target lateral flows 235 to the section manager 120, which converts the target lateral flows 235 to lane-change actions and transmits the lane-change actions to the one or more connected vehicles 160 in the applicable section 140. Two different embodiments of a section manager 120 are described in detail below.

For simplicity, the foregoing description, at times, speaks in terms of a single section manager 120 sending aggregated traffic state information 240 to locality manager 110 and the processing that RL module 220 performs in support of that single section manager 120. It should be understood that, in most embodiments, locality manager 110 serves (covers) a geographical area that includes at least one additional section 140 of the roadway 130. In such embodiments, RL module 220 processes additional aggregated macroscopic traffic state information 240 received from at least one additional section manager 120 in the at least one additional section 140 using the RL-based model 400 to determine at least one additional target lateral flow 235 for the two or more lanes 150 in the at least one additional section 140. In other words, in most embodiments, locality manager 110 operates within an architecture such as that depicted in FIG. 1, in which there are a plurality of sections 140 and corresponding section managers 120. In such an embodiment, locality manager 110 receives aggregated traffic state information 240 from each of the section managers 120 in the corresponding sections 140, and RL module 220 processes the aggregated traffic state information 240 to provide target lateral flows 235 to each of the section managers 120.

Figure 7:
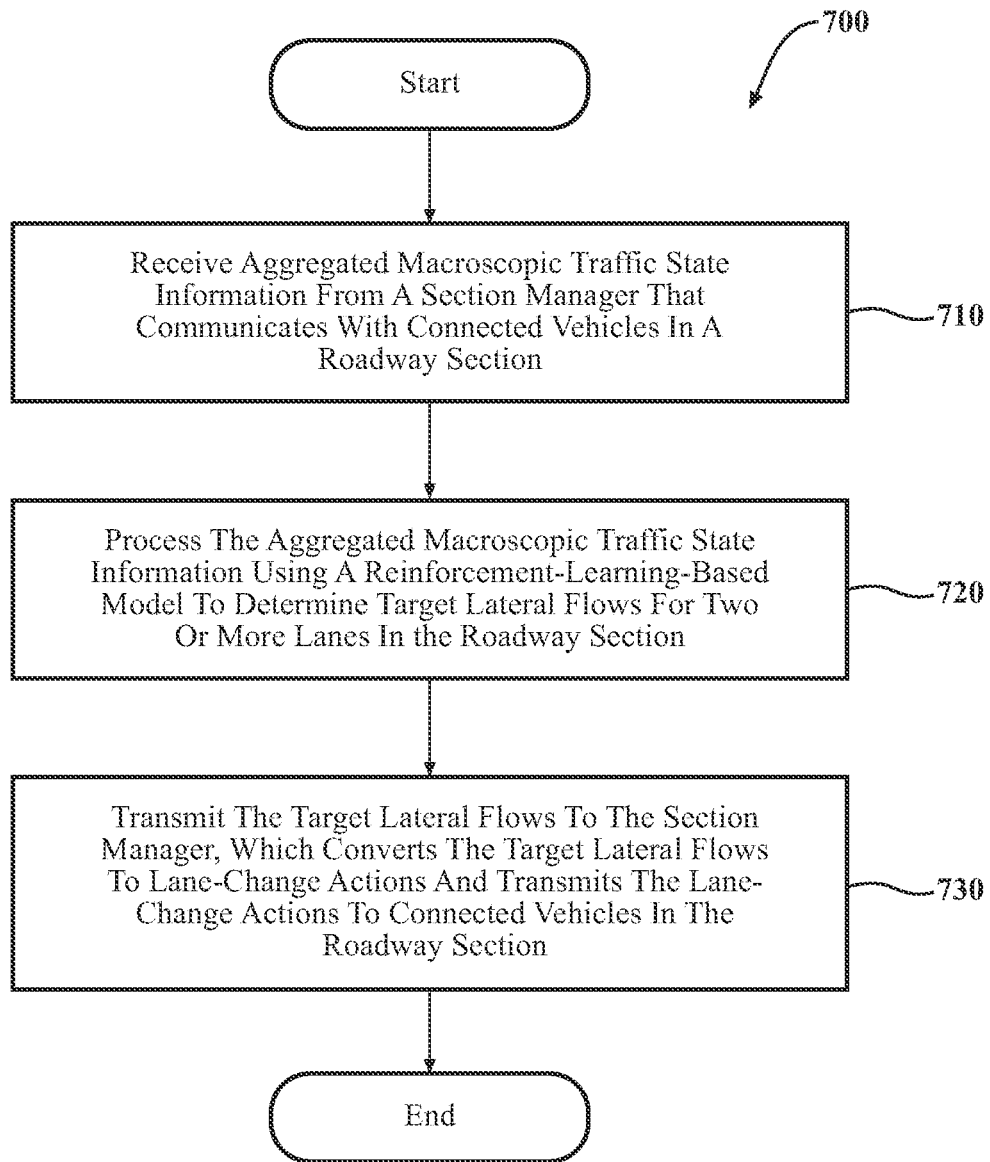
FIG. 7 is a flowchart of a method of traffic-flow regulation via centralized lateral flow control, in accordance with an illustrative embodiment of the invention.

FIG. 7 is a flowchart of a method 700 of traffic-flow regulation via centralized lateral flow control, in accordance with an illustrative embodiment of the invention. Method 700 will be discussed from the perspective of the locality manager 110 in FIG. 2 with reference to FIGS. 1, 3-6. While method 700 is discussed in combination with locality manager 110, it should be appreciated that method 700 is not limited to being implemented within locality manager 110, but locality manager 110 is instead one example of a system that may implement method 700.

At block 710, input module 215 receives aggregated macroscopic traffic state information 240 from a section manager 120 that communicates with one or more connected vehicles 160 in a section 140 of a roadway 130 (refer to FIG. 1). As discussed above, the aggregated traffic state information 240 can include information such as (1) the density of section i, lane j, $\rho_{i,j}$; (2) the longitudinal flow to section i, lane j, $q_{i,j}$; and (3) the net lateral flow from lane j to lane j+1 in section i, $f_{i,j}$.

At block 720, RL module 220 processes the aggregated macroscopic traffic state information 240 using a RL-based model 400 to determine target lateral flows 235 for two or more lanes 150 of the roadway 130 in the section 140 of the roadway 130. As discussed above, the RL-based model 400, in some embodiments, is based on a MDP. An embodiment of the RL-based model 400 and the parameters of the MDP are discussed in detail above.

At block 730, output module 225 transmits the target lateral flows 235 to the section manager 120, which converts the target lateral flows 235 to lane-change actions and transmits the lane-change actions to the one or more connected vehicles 160. As explained above, two different embodiments of a section manager 120 are described in detail below.

In some embodiments, method 700 may include actions that are not shown in FIG. 7. For example, in some embodiments, RL module 220 outputs an attractiveness term, and the target lateral flow 235 for a lane 150 among the two or more lanes 150 of the roadway 130 is computed from a minimum lateral flow 610, a maximum lateral flow 620, and the attractiveness term. As discussed above, in some embodiments, the target lateral flows 235 are entirely to the left. In other embodiments, the target lateral flows 235 can be to the left, to the right, or both (mixed). As also discussed above, in some embodiments, RL-based model 400 includes a discount factor γ that can act as a societal-impact parameter that determines the extent to which the one or more connected vehicles 160 are favored over legacy vehicles 170 in achieving a predetermined traffic-flow objective. As explained above, in some embodiments, the predetermined traffic-flow objective on which the reward function r is based is average speed (e.g., the average speed of the connected vehicles 160 and the average speed of all vehicles, both connected vehicles 160 and legacy vehicles 170).

As also discussed above, in most embodiments, locality manager 110 operates within an architecture such as that depicted in FIG. 1, in which there are a plurality of sections 140 and corresponding section managers 120. In such an embodiment, locality manager 110 receives aggregated traffic state information 240 from each of the section managers 120 in the corresponding sections 140, and RL module 220 processes the aggregated traffic state information 240 to provide target lateral flows 235 to each of the section managers 120. As discussed above, in some embodiments, at least some of the connected vehicles 160 are autonomous vehicles.

Section Manager Embodiment 1

Figure 8:
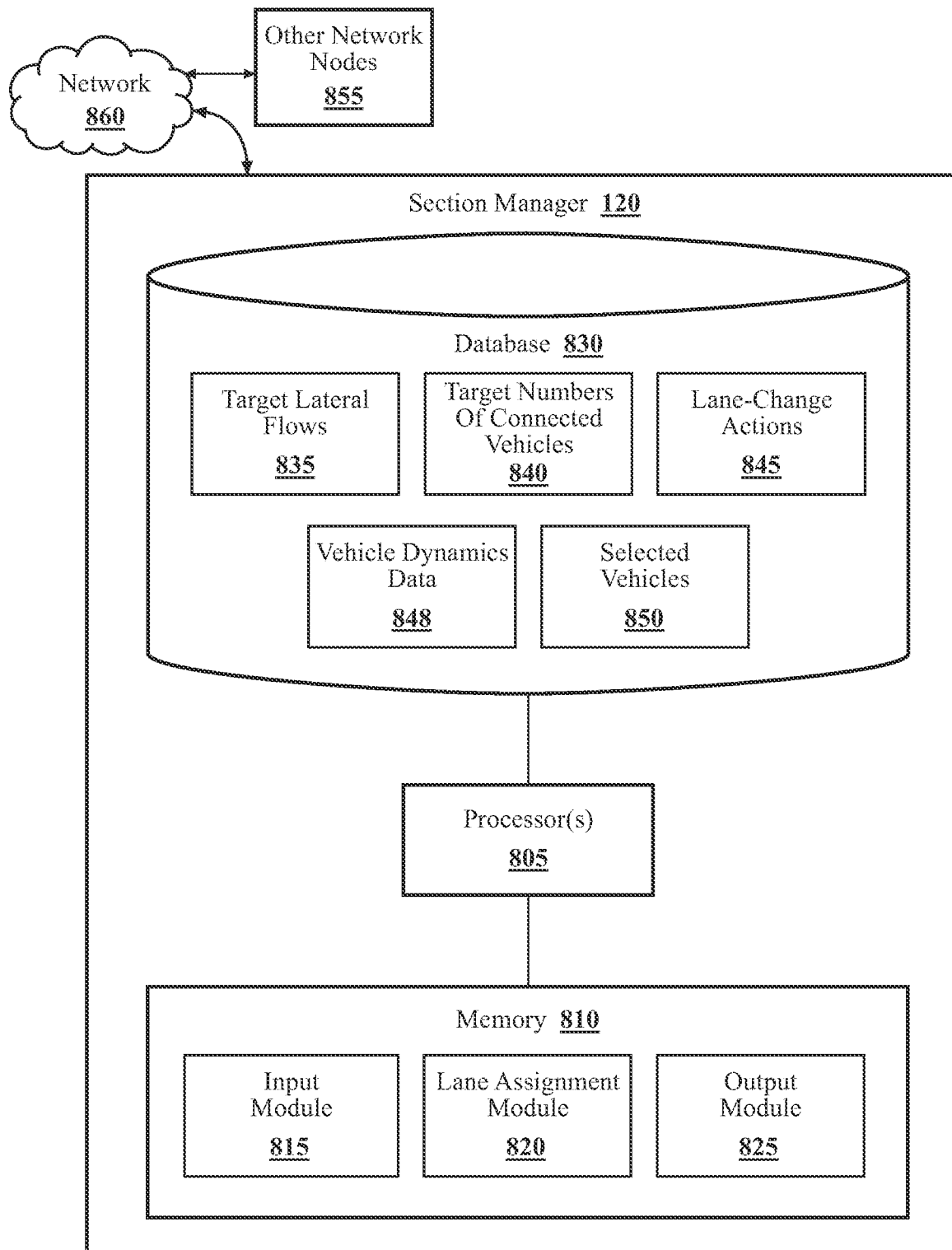
FIG. 8 is a block diagram of a section manager, in accordance with an illustrative embodiment of the invention.

FIG. 8 is a block diagram of a section manager 120, in accordance with an illustrative embodiment of the invention. In FIG. 8, locality manager 120 includes one or more processors 805 to which a memory 810 is communicably coupled. More specifically, in this embodiment, memory 810 stores an input module 815, a lane assignment module 820, and an output module 825. The memory 810 is a random-access memory (RAM), read-only memory (ROM), a hard-disk drive, a flash memory, or other suitable non-transitory memory for storing the modules 815, 820, and 825. The modules 815, 820, and 825 are, for example, machine-readable instructions that, when executed by the one or more processors 805, cause the one or more processors 805 to perform the various functions disclosed herein.

As shown in FIG. 8, section manager 120 can store various kinds of data in a database 830. For example, section manager 120 can store target lateral flows 835, target numbers of connected vehicles 840, lane-change actions 845, vehicles dynamics data 848, and selected vehicles 850. These various types of data are discussed further below.

As shown in FIG. 8, section manager 120 can communicate with other network nodes 855 (e.g., locality manager 110 and connected vehicles 160) via a network 860. In communicating with the other network nodes 855, section manager 120 can make use of communication technologies such as cellular data (LTE, 5G, 6G, etc.), DSRC, Bluetooth LE, etc.

Input module 815 generally includes instructions that, when executed by the one or more processors 805, cause the one or more processors 805 to receive from a locality manager 110 target lateral flows 835 for two or more lanes 150 of a roadway 130 in a section 140 of the roadway 130 that includes one or more connected vehicles 160. Embodiments of a locality manager 110 and the manner in which a locality manager 110 generates the lateral flows 835 (a subset, for a single section 140, of the target lateral flows 235 in FIG. 2) are discussed in detail above.

In the embodiment of FIG. 8, section manager 120 includes a heuristic model that performs vehicle-level control based on the target lateral flows 835 received from the locality manager 110. This involves converting lateral flow to lane-change actions 845 every $\Delta t_{section}$ seconds and choosing specific connected vehicles 160 for lane changes in a manner that minimizes disturbances and maximizes safety. In some embodiments, the possible lane-change actions a given connected vehicle 160 can receive from section manager 120 are move to the left, move to the right, or a "no-op," short for "no operation," meaning that the vehicle simply remains in its current lane (no lane change). As discussed in greater detail below, in the embodiment of FIG. 8, section manager 120 employs a ranking-based algorithm that converts aggregated target lateral flows 835 obtained from a locality manager 110 to section-level connected-vehicle lane-change actions 845.

The ranking algorithm can be summarized as follows: (1) Convert target lateral flows 835 to a target number of connected vehicles 160; (2) Rank the connected vehicles 160 based on their distance from a following vehicle in the target (new or moved-to) lane; (3) Select, based on the ranking, connected vehicles 160 to change lanes and transmit lane-change actions 845 to the connected vehicles 160 in the section 140; (4) Update the number of vehicles missed; and (5) Repeat Steps 1-5. These steps are elaborated upon below.

Regarding Step 1, target lateral flows 835 can be converted to a target number of vehicles, $n_{veh}$, through the following equation: $n_{veh} = f_{lat} \cdot \Delta t_{section} + n_{missing}$, where $f_{lat}$ is the target lateral flow 835, $\Delta t_{section}$ is the section-control interval, and $n_{missing}$ is the number of missing connected vehicles 160 (i.e., connected vehicles 160 that, for whatever reason, were unable to change lanes in response to lane-change actions 845 received from section manager 120 during prior iterations of the algorithm). In some embodiments, $n_{missing}$ is initialized to zero during the first iteration. Note that, in the embodiment of FIG. 8, no connected vehicles 160 are moved in a direction opposite the specified direction of the target lateral flow 835. In one embodiment, $\Delta t_{section}$ is 5 s, but this parameter can vary, depending on the embodiment.

Figure 9A:
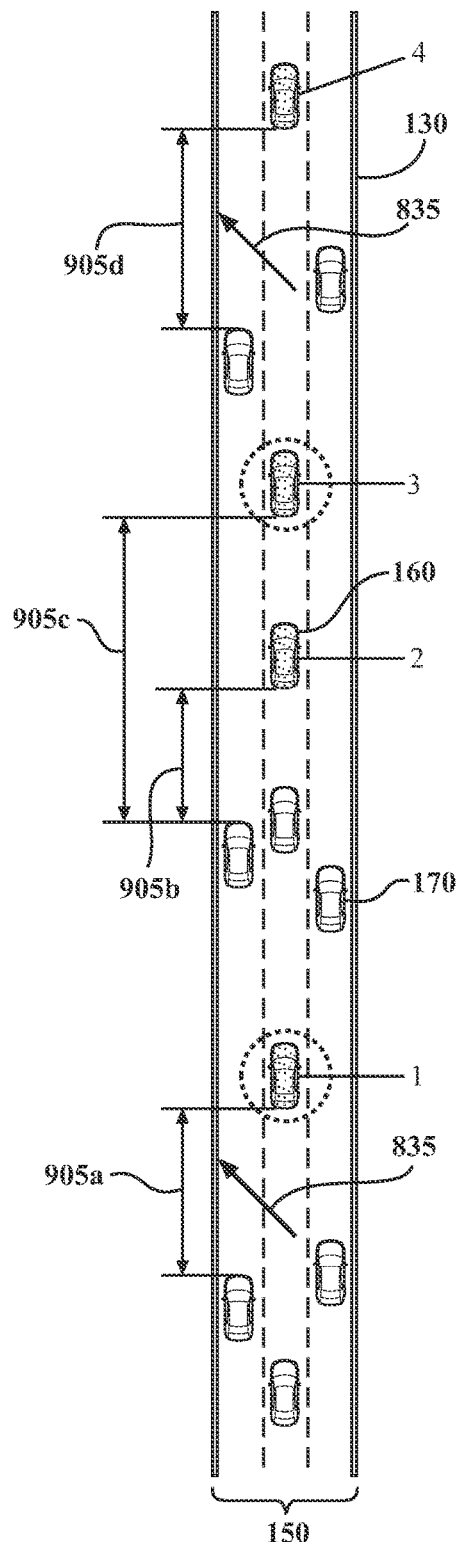
FIG. 9A is an illustration of connected vehicles and their respective measured distances to a following vehicle in the target lane, in accordance with an illustrative embodiment of the invention.
Figure 9B:
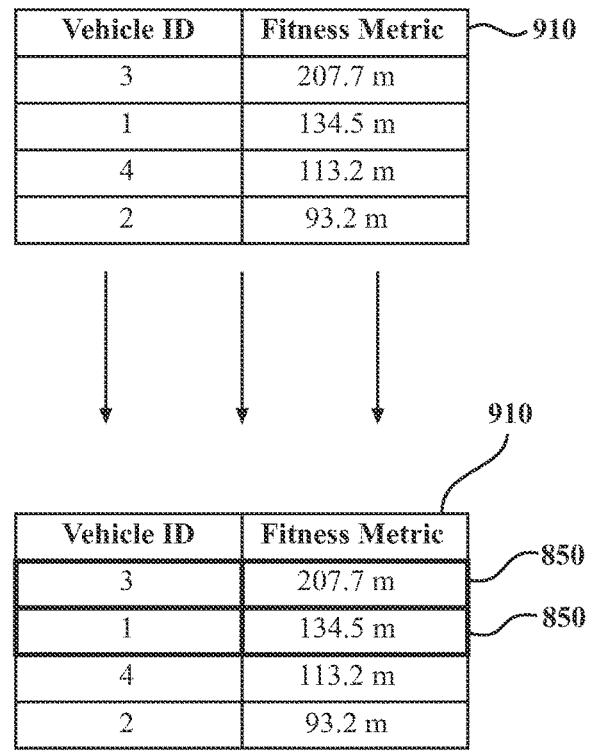
FIG. 9B is a diagram of a ranking process based on the respective measured distances from connected vehicles to a following vehicle in the target lane, in accordance with an illustrative embodiment of the invention.
Figures 10A, 10B:
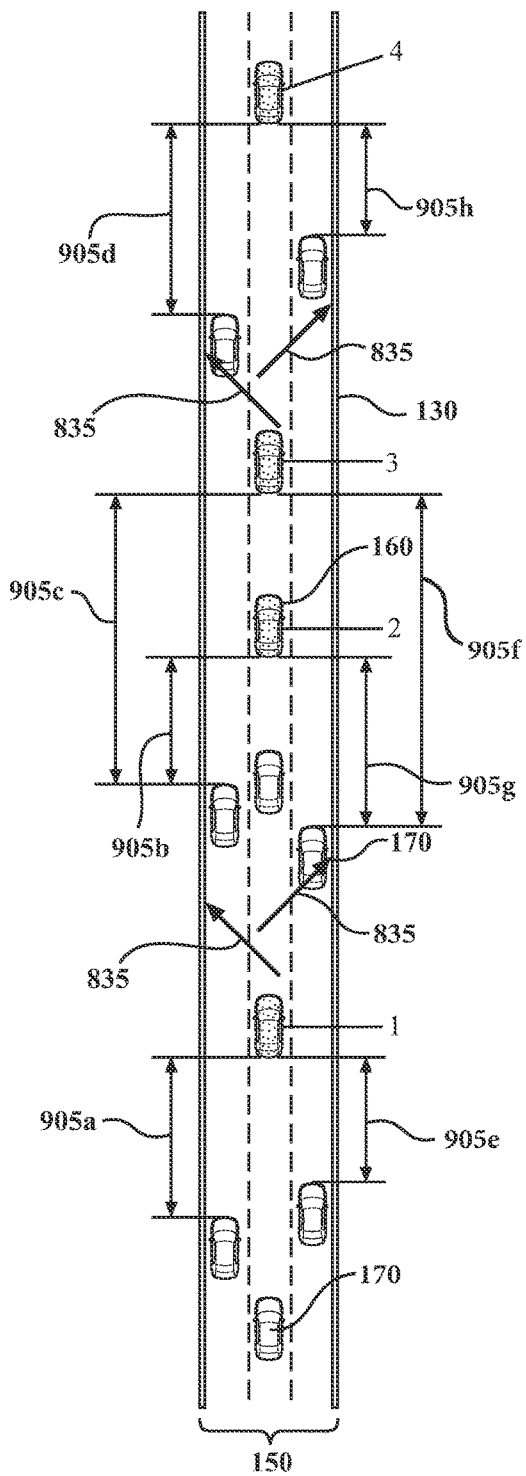
FIG. 10A is an illustration of connected vehicles and their respective measured distances to a following vehicle in the target lane, in accordance with another illustrative embodiment of the invention.
FIG. 10B is a diagram of a ranking process based on the respective measured distances from connected vehicles to a following vehicle in the target lane in the case of bidirectional lateral flows, in accordance with an illustrative embodiment of the invention.

Steps 2 and 3 are explained in connection with FIGS. 9A-10B. FIGS. 9A and 9B pertain to an embodiment in which all target lateral flows 835 are to the left (unidirectional target lateral flows 835). FIGS. 10A and 10B pertain to a different embodiment in which the target lateral flows 835 are to the left and to the right, and conflicts between those bidirectional target lateral flows 835 need to be resolved.

FIG. 9A is an illustration of connected vehicles 160 and their respective measured distances to a following vehicle in the target (new) lane 150, in accordance with an illustrative embodiment of the invention. Connected vehicles 160 use their onboard sensors (e.g., cameras, LIDAR, radar, sonar) to detect other vehicles on roadway 130 (e.g., nearby and surrounding vehicles in the same or a different lane 150). Based on the sensor data, connected vehicles 160 can measure the distance to other vehicles, whether the other vehicles are connected vehicles 160 or legacy vehicles 170. These distance measurements can be transmitted to section manager 120 (specifically, to input module 815) as part of the vehicle dynamics data 848 that the connected vehicles 160 report to the section manager 120. Of particular interest to section manager 120 are the distances 905a-d shown in FIG. 9A. Those distances are the respective distances between a given connected vehicle (labeled "1," "2," "3," and "4" in FIG. 9A to distinguish them) and the following vehicle in the target (new) lane 150. The target or new lane 150 is the lane of roadway 130 to which the connected vehicle 160 could potentially be directed to move in a lane change. Note that, in the embodiment depicted in FIG. 9A, all target lateral flows 835 are to the left, as discussed above.

FIG. 9B is a diagram of a ranking process based on the respective measured distances 905a-d from connected vehicles 160 to a following vehicle in the target lane 150, in accordance with an illustrative embodiment of the invention. As shown in the example of FIG. 9B, vehicle rankings 910 list the Connected Vehicles 1-4 in descending order of their corresponding measured distances 905a-d. Connected vehicles 160 with the largest following gaps are desirable from a safety standpoint because directing those vehicles to change lanes is less likely to disturb traffic or lead to collisions. In the example of FIG. 9B, the number of vehicles for lane change $n_{veh}$ calculated in Step 1 is 2, so the top 2 connected vehicles 160 (Connected Vehicles 3 and 1, respectively) are selected for lane change (to the left). These two connected vehicles 160 may be termed "selected vehicles" 850. In some embodiments, the distances from connected vehicles 160 to leading (preceding) vehicles in the target lane are also included in the analysis.

FIG. 10A is an illustration of connected vehicles 160 and their respective measured distances 905a-h to a following vehicle in the target lane, in accordance with another illustrative embodiment of the invention. In the bidirectional lane-change embodiment of FIG. 10A, the number of vehicles for lane change to the left, $n_{veh,l}$, and the number of vehicles for lane change to the right, $n_{veh,r}$, are both assumed to be 2, for the sake of illustration. In the embodiment of FIG. 10A, the following-vehicle distances 905a-d pertain to lateral flows 835a-b to the left (as in the embodiment of FIG. 9A), and following-vehicle distances 905e-h pertain to lateral flows 835c-d to the right.

FIG. 10B is a diagram of a ranking process based on the respective measured distances 905a-h from connected vehicles 160 to a following vehicle in the target lane 150 in the case of bidirectional target lateral flows 835, in accordance with an illustrative embodiment of the invention. As shown in the top portion of FIG. 10B, vehicle rankings 910 and vehicle rankings 1005 list the vehicles in descending order of their corresponding measured distances 905a-d (leftward lateral flow) and 905e-h (rightward lateral flow), respectively. The question arises of what to do about conflicts between the leftward and rightward rankings. In this embodiment, a multi-objective selection algorithm is used to resolve the conflicts. For example, in this embodiment, a Gray Relational Optimization algorithm is used, which minimizes the distance from the optimum for both leftward and rightward directions, and both directions are weighed equally. The middle portion of FIG. 10B shows one possible solution (the shaded rows of the respective listings 910 and 1005) under a Gray Relational Optimization algorithm. In this example, Connected Vehicles 1 and 4 are selected to change lanes to the left, and Connected Vehicles 2 and 3 are selected to change lanes to the right.

Continuing with the example of FIGS. 10A and 10B, the first step of the Gray Relational Optimization algorithm is to pair lane-change options to match the $n_{veh}$ targets, as illustrated in the bottom portion of FIG. 10B (Element 1010), resulting in a matrix such as the following:

$$f = \begin{bmatrix} 227.7 & 310.3 \\ 342.2 & 201.1 \\ \ldots & \ldots \end{bmatrix}.$$

Next, the objective values are normalized:

$$F_{ij} = \frac{f_{ij} - \min_{i \in m} f_{ij}}{\max_{i \in m} f_{ij} \min_{i \in m} f_{ij}}.$$

Next, the reference network points are identified:

$$F_j^+ = \max_{i \in m} F_{ij},$$

after which the difference is calculated between $F_j^+$ and $F_{ij}$: $\Delta I_{ij} = |F_j^+ - F_{ij}|$. Next, the value of the Gray Relational Coefficient (GRC) is calculated for each solution:

$$GRC_i = \frac{1}{m} \sum \frac{\Delta_{min} + \Delta_{max}}{\Delta I_{ij} + \Delta_{max}},$$

where $\Delta_{min} = \min_{i \in m} \min_{j \in n} \Delta I_{ij}$, and $\Delta_{max} = \max_{i \in m} \max_{j \in n} \Delta I_{ij}$.

Finally, the largest $GRC_i$ is identified. The corresponding solution is the recommended solution to resolve the conflicts.

Upon completion of Step 3 (selecting the connected vehicles 160 that will change lanes), the lane-change actions 845 have been determined, and section manager 120 can transmit the lane-change actions 845 (to the left, to the right, or no-op) to connected vehicles 160 in the section 140. Of course, only the lane-change actions 845 directed to the selected connected vehicles 160 (850) will involve a lane change. The remaining connected vehicles 160 in the section 140 receive no-ops.

Regarding Step 4, this step accounts for situations in which not all $n_{veh}$ vehicles can be moved (i.e., successfully directed to change lanes). This can occur for various reasons, but two primary reasons are (1) $n_{veh}$ is greater than the number of connected vehicles 160 in the section and (2) not all of the connected vehicles 160 can be safely moved to the aspirational adjacent lane 150. In the embodiment of FIG. 8, $n_{missing}=n_{missing}+f_{lat} \cdot \Delta t_{section}-n_{actual}$, where $n_{actual}$ is the number of connected vehicles 160 that successfully changed lanes. The foregoing calculation has the following effects: (1) if fewer vehicles change lanes than is targeted, this is remembered and adjusted for in subsequent iterations of the heuristic ranking algorithm and (2) if more vehicles change lanes than is targeted (because lane-changes were missed earlier), the number is adjusted to reflect this.

Step 5 is, as indicated above, to repeat the ranking algorithm and transmission of lane-change actions 845 periodically at a predetermined time interval (e.g., every $\Delta t_{section}$ seconds).

Given the above step-by-step explanation of the ranking algorithm and the Gray Relational Optimization algorithm, the functions performed by lane assignment module 820 can now be summarized. Referring once again to FIG. 8, lane assignment module 820 generally includes instructions that, when executed by the one or more processors 805, cause the one or more processors 805 to convert the target lateral flows 835 to a target number of connected vehicles N (840) and to select for lane change a set of N connected vehicles 160 whose ranked distances from a following vehicle in a target lane 150 are greatest among the one or more connected vehicles 160 in the section of the roadway 140, when the direction of lane change is uniform among the set of N connected vehicles 160. For example, in the embodiment discussed above in connection with FIGS. 9A and 9B, the direction of lane change is uniform (the same) for all N selected connected vehicles 160 (the selected vehicles 850). In that example, all lane changes are to the left. In a different embodiment, all lane changes for the N selected connected vehicles 160 could instead be to the right, in which case the direction of lane change would also be uniform (the same) for all N of the selected connected vehicles 160.

Referring once again to Step 5 of the ranking algorithm discussed above, in some embodiments, lane assignment module 820 includes further instructions that, when executed by the one or more processors 805, cause the one or more processors 805 to repeat periodically, at a predetermined interval (e.g., every $\Delta t_{section}$ seconds), the above ranking algorithm to convert target lateral flows 835 to specific lane-change actions 845 for connected vehicles 160 and to transmit the lane-change actions 845 to the connected vehicles 160.

As discussed above in connection with FIGS. 10A and 10B, in other embodiments, the direction of lane change can differ among a set of N selected connected vehicles 160 (850). In the example of FIGS. 10A and 10B, some of the selected connected vehicles 160 are chosen to change lanes to the left, whereas others are chosen to change lanes to the right within the same section 140. In such an embodiment, lane assignment module 820 selects for lane change a set of N connected vehicles 160 in accordance with a multi-objective selection algorithm. As discussed above, one such multi-objective selection algorithm that is used, in some embodiments, is a Gray Relational Optimization algorithm.

Again referring to FIG. 8, output module 825 generally includes instructions that, when executed by the one or more processors 805, cause the one or more processors 805 to transmit lane-change actions 845 to the set of N connected vehicles 160 via network 860. The manner in which the lane-change actions 845 are determined is discussed in detail above. The lane-change actions 845 transmitted to the set of N connected vehicles 160 are those involving an actual lane change. As discussed above, section manager 120 also transmits lane-change actions 845 to the remaining connected vehicles 120 in the section 140, but those remaining connected vehicles 160 receive no-ops (i.e., stay in the current lane).

Figure 11:
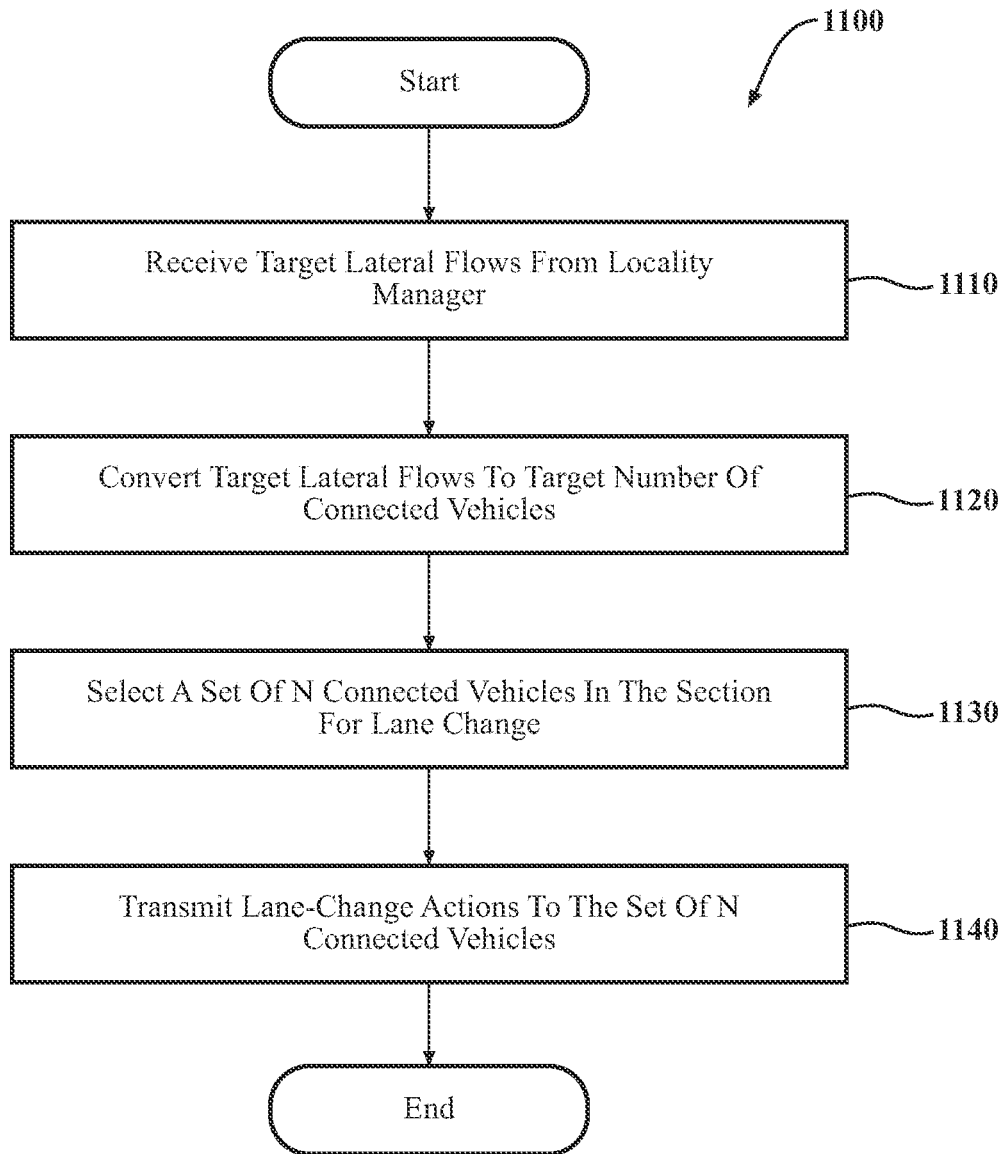
FIG. 11 is a flowchart of a method of coordinated vehicle lane assignment, in accordance with an illustrative embodiment of the invention.

FIG. 11 is a flowchart of a method 1100 of coordinated vehicle lane assignment, in accordance with an illustrative embodiment of the invention. Method 1100 will be discussed from the perspective of the section manager 120 in FIG. 8 with reference to FIGS. 9A-10B. While method 1100 is discussed in combination with section manager 120, it should be appreciated that method 1100 is not limited to being implemented within section manager 120, but section manager 120 is instead one example of a system that may implement method 1100.

At block 1110, input module 815 receives from a locality manager 110 target lateral flows 835 for two or more lanes 150 of a roadway 130 in a section 140 of the roadway 130 that includes one or more connected vehicles 160. Embodiments of a locality manager 110 and the manner in which a locality manager 110 generates the lateral flows 835 are discussed in detail above.

At blocks 1120 and 1130, lane assignment module 820 carries out a ranking algorithm (discussed in detail above) to convert the target lateral flows 835 to a target number of connected vehicles 160 in the applicable section 140 and, ultimately, to select specific connected vehicles 160 for lane change with their corresponding assigned lane-change actions 845. More specifically, lane assignment module 820 converts the target lateral flows 835 to a target number of connected vehicles N (840) and selects for lane change a set of N connected vehicles 160 whose ranked distances 190 from a following vehicle in a target lane 150 are greatest among the one or more connected vehicles 160 in the section 140 of the roadway, when the direction of lane change is uniform among the set of N connected vehicles. This kind of embodiment is discussed above in connection with FIGS. 9A and 9B.

As explained above in connection with FIGS. 10A and 10B, in other embodiments, the direction of lane change can differ among the set of N selected connected vehicles 160. In the example of FIGS. 10A and 10B, some of the selected connected vehicles 160 are chosen to change lanes to the left, whereas others are chosen to change lanes to the right within the same section 140. In such an embodiment, lane assignment module 820 selects for lane change a set of N connected vehicles 160 in accordance with a multi-objective selection algorithm. As also discussed above, one such multi-objective selection algorithm that is used, in some embodiments, is a Gray Relational Optimization algorithm.

At block 1140, output module 825 transmits lane-change actions 845 to the set of N connected vehicles 160 via network 860. The manner in which the lane-change actions 845 are determined is discussed in detail above. As discussed above, section manager 120 can also transmit lane-change actions 845 to the remaining connected vehicles 160 in the section 140, but those remaining connected vehicles 160 receive no-ops (i.e., stay in the current lane).

In some embodiments, method 1100 may include actions that are not shown in FIG. 11. For example, in some embodiments, lane assignment module 820 accounts for missed vehicles that were unable to change lanes in response to previously transmitted lane-change actions 845, as discussed above. As also discussed above, distance measurements 905 can be transmitted to section manager 120 (specifically, to input module 815) as part of the vehicle dynamics data 848 that the connected vehicles 160 report to the section manager 120. As also discussed above, in some embodiments, lane assignment module 820 periodically repeats, at a predetermined interval (e.g., every $\Delta t_{section}$ seconds), the ranking algorithm discussed above to convert target lateral flows 835 to specific lane-change actions 845 for connected vehicles 160 and to transmit the lane-change actions 845 to the selected vehicles 850 (the N selected connected vehicles 160).

Section Manager Embodiment 2

Figure 12:
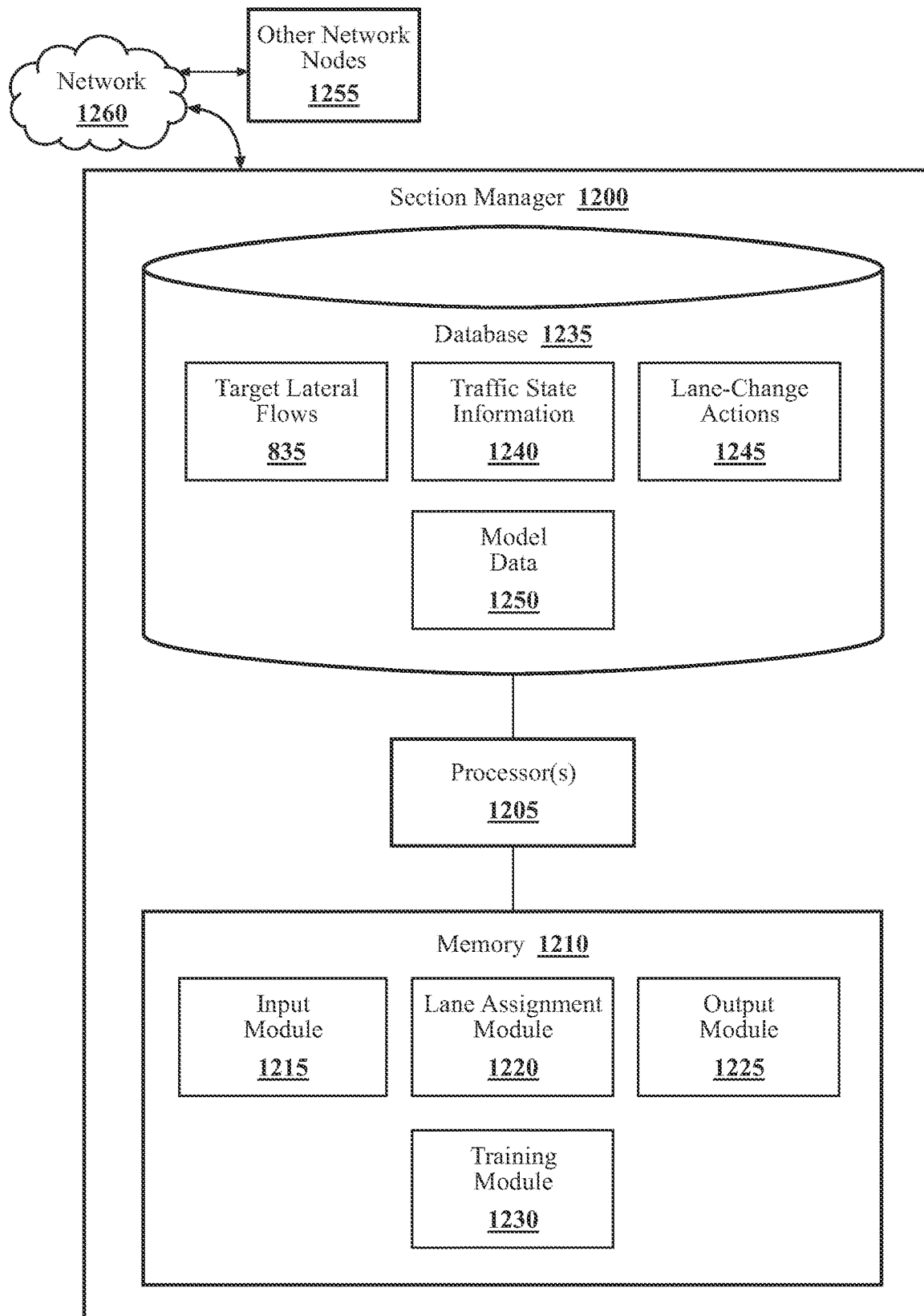
FIG. 12 is a block diagram of a section manager, in accordance with another illustrative embodiment of the invention.

FIG. 12 is a block diagram of a section manager 1200, in accordance with another illustrative embodiment of the invention. In FIG. 12, locality manager 1200 includes one or more processors 1205 to which a memory 1210 is communicably coupled. More specifically, in this embodiment, memory 1210 stores an input module 1215, a lane assignment module 1220, an output module 1225, and a training module 1230. The memory 1210 is a random-access memory (RAM), read-only memory (ROM), a hard-disk drive, a flash memory, or other suitable non-transitory memory for storing the modules 1215, 1220, 1225, and 1230. The modules 1215, 1220, 1225, and 1230 are, for example, machine-readable instructions that, when executed by the one or more processors 1205, cause the one or more processors 1205 to perform the various functions disclosed herein.

As shown in FIG. 12, section manager 1200 can store various kinds of data in a database 1235. For example, section manager 1200 can store target lateral flows 835, traffic state information 1240, lane-change actions 1245, and model data 1250. Model data 1250 can include, for example, hyperparameters, parameters, neural-network weights, the results of intermediate calculations, etc., associated with a RL-based MDP model used by section manager 1200 to convert target lateral flows 835 to lane-change actions 1245 for connected vehicles 160 in a section 140 of roadway 130. RL-based model 1300 is discussed in detail below in connection with FIGS. 13A-14C.

As shown in FIG. 12, section manager 1200 can communicate with other network nodes 1255 (e.g., locality manager 110 and connected vehicles 160) via a network 1260. In communicating with the other network nodes 1255, section manager 1200 can make use of communication technologies such as cellular data (LTE, 5G, 6G, etc.), DSRC, Bluetooth LE, etc.

Input module 1215 generally includes instructions that, when executed by the one or more processors 1205, cause the one or more processors 1205 to receive from a locality manager 110 target lateral flows 835 for two or more lanes 150 of a roadway 130 in a section 140 of the roadway 130 and to receive traffic state information 1240 from a plurality of connected vehicles 160 in the section 140 of the roadway 130. Embodiments of a locality manager 110 and the manner in which a locality manager 110 generates the lateral flows 835 (a subset, for a single section 140, of the target lateral flows 235 in FIG. 2) are discussed in detail above.

In the embodiment of FIG. 12, section manager 1200 includes a RL framework that performs vehicle-level control based on the target lateral flows 835 received from the locality manager 110. This involves converting lateral flow to lane-change actions 1245 for connected vehicles 160 every $\Delta t_{section}$ seconds in a manner that minimizes traffic disturbances and maximizes safety. In some embodiments, the possible lane-change actions 1245 a given connected vehicle 160 can receive from section manager 1200 are move to the left, move to the right, or a no-op (stay in the current lane). The RL framework is discussed in greater detail below.

Lane assignment module 1220 generally includes instructions that, when executed by the one or more processors 1205, cause the one or more processors 1205 to process the traffic state information 1240 and the target lateral flows 835 using a RL-based model to determine lane-change actions 1245 for the plurality of connected vehicles 160. In the embodiment of FIG. 12, the RL-based model is based on a single neural network with shared parameters for the plurality of connected vehicles 160 in the applicable section 140. In the embodiment of FIG. 12, the problem of converting the target lateral flows 835 received from a locality manager 110 to lane-change actions 1245 is formulated as a MDP. In some embodiments, the MDP includes (1) states defined in terms of lateral flows and microscopic traffic states, including position and velocity of each connected vehicle 160 and leading and following vehicles in current and adjacent lanes 150; (2) actions for each connected vehicle 160, including move to the right, move to the left, and stay in the current lane (no-op); (3) a reward function that balances efficiency and safety while meeting the assigned target lateral flows 835; and (4) transition dynamics, which includes car-following, lane-changing, and section-level control. The RL-based model is discussed in greater detail below in connection with FIGS. 13A-14C.

FIG. 13A is a diagram of a RL-based MDP model 1300 (hereinafter "RL-based model 1300") in section manager 1200, in accordance with an illustrative embodiment of the invention. As shown in FIG. 13A, RL-based model 1300 includes an agent 1310 that includes a neural network and an associated policy, MDP environment 1320, actions 1330, and states and rewards 1340. In this embodiment, the MDP is expressed mathematically as the following tuple: ($\mathcal{S}$, $\mathcal{A}$, $\mathcal{P}$, r, $\rho_0$, $\gamma$, T), where $\mathcal{S} \subseteq \mathbb{R}^n$ is an n-dimensional state space, $\mathcal{A} \subseteq \mathbb{R}^m$ is an m-dimensional action space, $\mathcal{P}: \mathcal{S} \times \mathcal{A} \times \mathcal{S} \to \mathbb{R}_+$ is a transition probability function, r: $\mathcal{S} \to \mathbb{R}$ is a bounded reward function, $\rho_0: \mathcal{S} \to \mathbb{R}_+$ is an initial state distribution, $\gamma \in (0, 1]$ is a discount factor, and T is a time horizon. In the MDP, an agent 1310 is in a state $s_t \in \mathcal{S}$ in the environment 1320 and interacts with this environment 1320 by performing actions $a_t \in \mathcal{A}$ (1330). The agent's actions 1330, in this embodiment, are defined by a policy $\pi_\theta := \mathcal{S} \times \mathcal{A} \to \mathbb{R}_+$ parameterized by $\theta$. The objective of the agent 1310 is to learn an optimal policy $\theta^* := \text{argmax}_\theta \eta(\pi_\theta)$, where $\eta(\pi_\theta) = \Sigma_{i=0}^T \gamma^i r_i$ is the expected discounted return. Various parameters in the tuple discussed above are discussed in greater detail below.

Regarding the states $\mathcal{S}$, as discussed above, the RL-based model 1300 uses lateral flows and microscopic traffic states (traffic state information 1240), including position and velocity data for each ego connected vehicle 160 and leading and following vehicles in current and adjacent lanes 150. This is illustrated as system states 1350 in FIG. 13B. In FIG. 13B (and in other figures herein), "CV" stands for "connected vehicle." In some embodiments, the traffic state information 1240 can include information regarding spatial relationships (e.g., distances measured using onboard vehicle sensors) between connected vehicles 160 in the applicable section 140 and other vehicles (connected or legacy) on the roadway 130.

Regarding the actions $\mathcal{A}$, in the embodiment of FIG. 12, there are three possible lane-change actions 1245 for each connected vehicle 160 in the applicable section 140, as discussed above: (1) move to the left, (2) move to the right, and (3) stay in the current lane 150 (no-op). This is illustrated as actions 1330 in FIG. 13C.

Regarding the reward function r, in the embodiment of FIG. 12, the reward function is $r_t = v_{avg,CV} + \gamma_1 \cdot v_{avg} -$ $\gamma_2 \cdot \|f_{lat,target} - f_{lat,obs}\|_2^2 - \gamma_3 \cdot TTC$, where $v_{avg,CV}$ is the average speed of the connected vehicles 160 in the applicable section 140; $v_{avg}$ is the average speed of all vehicles (connected vehicles 160 and legacy vehicles 170) in the section 140; $f_{lat,target}$ is the target (aspirational) lateral flow; $f_{lat,obs}$ is the actual (observed) lateral flow; $\gamma_1$, $\gamma_2$, and $\gamma_3$ are tuning parameters; and TTC is time to collision. In the above reward function, note that the L2 norm is applied to the difference between $f_{lat, target}$ and $f_{lat,obs}$, and that quantity is squared. If $\gamma_1$, $\gamma_2$, and $\gamma_3$ are all set to zero, the optimization of lane changes is for the benefit of the connected vehicles 160 only. If $\gamma_3$ is increased, safety is emphasized. The parameter $\gamma_2$ controls how important meeting the target lateral flow 835 is.

Regarding the transition probability function $\mathcal{P}$, this is based on car-following/lane-changing dynamics and section-manager dynamics. Regarding the initial state distribution $\rho_0$, this includes initial positions and speeds of both connected vehicles 160 and legacy vehicles 170 and information regarding the position and lane of an incident 195 (e.g., a slow-moving or stalled vehicle or other condition that impedes the flow of traffic on roadway 130).

One important feature of section manager 1200 is that the RL-based model 1300 includes a single neural network for controlling multiple connected vehicles 160 via parameter sharing. This is illustrated in FIGS. 14A-14C.

FIG. 14A illustrates a neural network 1400 employed in a MDP model in a section manager 1200, in accordance with an illustrative embodiment of the invention. As shown in FIG. 14A, the inputs to neural network 1400 (combined observations 1405) include information pertaining to all connected vehicles 160 addressed by the model. The outputs (combined actions 1410) include a group of three nodes for each connected vehicle 160. Each of those three nodes corresponds to one of the actions 1330 discussed above: (1) move to the left, (2) move to the right, and (3) stay in the same lane (no-op). To choose probabilistically from among the three output nodes for each modeled connected vehicle 160, lane assignment module 1220 employs a softmax algorithm 1415. In this embodiment, the number of hidden layers and nodes are tuned based on performance.

A significant benefit of the architecture just described is that, instead of learning $3^{15}$ different Q-functions, one function can be designed for each possible action 1330. The same model can then use all sampled information, improving the efficiency of the learning procedure. One challenge that arises in a practical implementation is variability in the number of connected vehicles 160 in the applicable section 140. In the embodiment of FIG. 12, lane assignment module 1220 assumes a maximum possible number $N_{CV}$ of connected vehicles 160 in the section 140 at any given time. Techniques for handling a situation in which the number of connected vehicles 160 is greater than $N_{CV}$ or less than $N_{CV}$ are discussed below in connection with FIGS. 14B and 14C.

FIG. 14B illustrates a situation in which the number of connected vehicles 160 in a section 140 exceeds the number of observation nodes 1405 in the neural network 1400, in accordance with an illustrative embodiment of the invention. As indicated in FIG. 14B, additional connected vehicles 160 beyond $N_{CV}$ (connected vehicle 160a) are ignored, in this embodiment.

FIG. 14C illustrates a situation in which the number of observation nodes 1405 in the neural network 1400 exceeds the number of connected vehicles 160 in a section 140, in accordance with an illustrative embodiment of the invention. As indicated in FIG. 14C, unused observation nodes 1405 are padded with zeroes, and the corresponding output (action) nodes 1410 are ignored.

In some embodiments, lane assignment module 1220 includes further instructions that, when executed by the one or more processors 1205, cause the one or more processors 1205 to repeat periodically, at a predetermined interval (e.g., every $\Delta t_{section}$ seconds), the above RL-based process to convert target lateral flows 835 to lane-change actions 1245 for connected vehicles 160 and transmit the lane-change actions 1245 to the connected vehicles 160.

Referring again to FIG. 12, training module 1230 generally includes instructions that, when executed by the one or more processors 1205, cause the one or more processors 1205 to train the RL-based model 1300, which includes neural network 1400, as discussed above. In some embodiments, training module 1230 employs an output activation function, namely a Gumbel softmax algorithm, so that the softmax algorithm used in training is differentiable. In some embodiments, training module 1230 uses a cross-entropy loss function, and gradient masking is applied to deal with variability in the number of vehicles during training. Further, in some embodiments, training module 1230 uses imitation learning to warm-start the training process. For example, neural network 1400 can be trained using expert demonstrations. In such an embodiment, an existing lane-change model such as MOBIL can be used as the expert, which generates simulated data for training purposes. To improve the robustness of weights that are infrequently trained, in some embodiments, training module 1230 employs vehicle placement randomization. Without this technique, some nodes (e.g., the bottom nodes 1405 in the input layer) will often not have any input data because the number of vehicles changes. As a result, some portion of the neural network 1400 will not receive sufficient gradient flow. Randomization of vehicle placement during training overcomes this difficulty.

Referring again to FIG. 12, output module 1225 generally includes instructions that, when executed by the one or more processors 1205, cause the one or more processors 1205 to transmit the lane-change actions 1245 to the plurality of connected vehicles 160 via network 1260. The lane-change actions 1245 are generated and output by the RL-based model 1300 discussed above.

Figure 15:
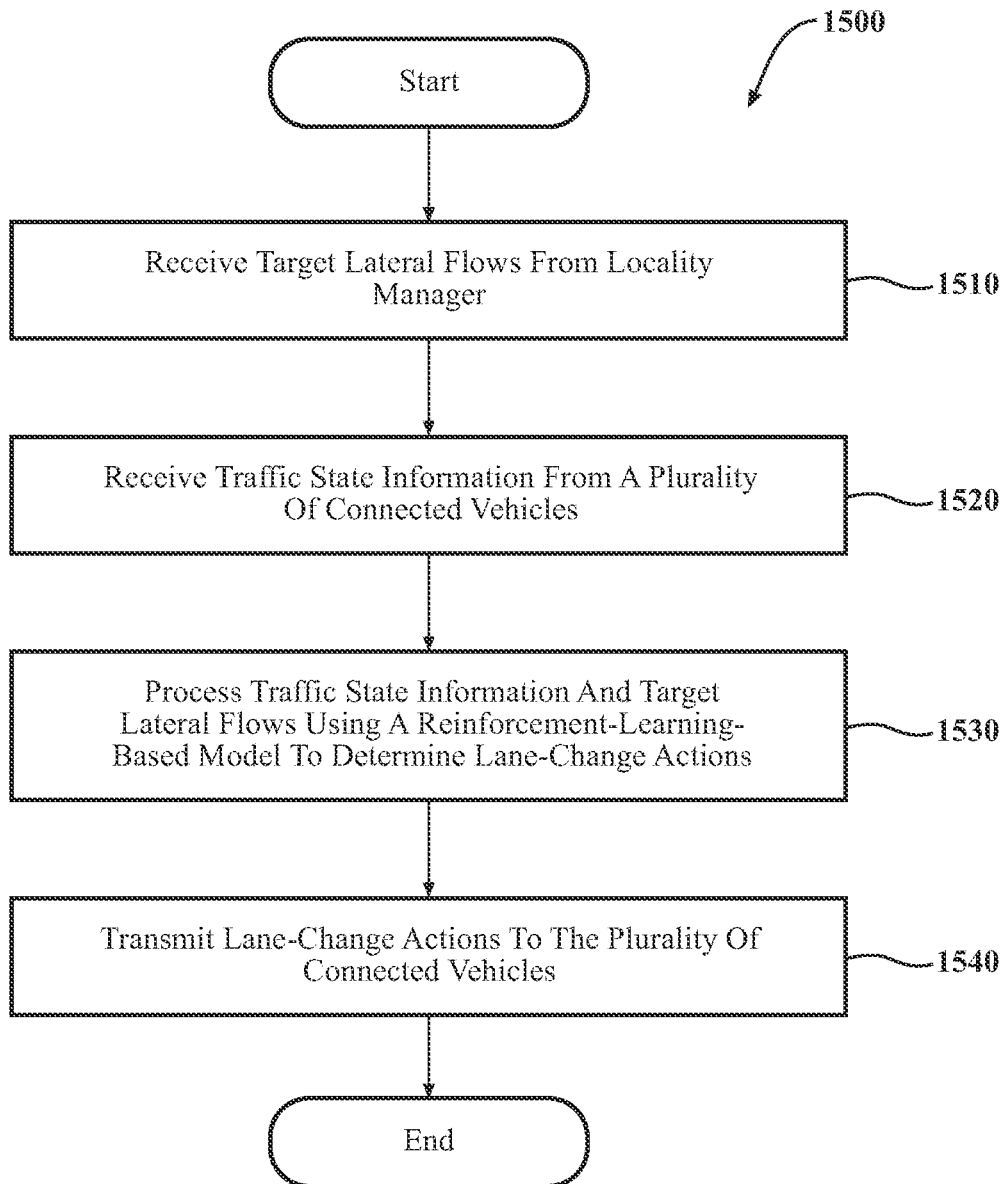
FIG. 15 is a flowchart of a method of coordinated vehicle lane assignment, in accordance with another illustrative embodiment of the invention.

FIG. 15 is a flowchart of a method 1500 of coordinated vehicle lane assignment, in accordance with another illustrative embodiment of the invention. Method 1500 will be discussed from the perspective of the section manager 1200 in FIG. 12 with reference to FIGS. 13A-14C. While method 1500 is discussed in combination with section manager 1200, it should be appreciated that method 1500 is not limited to being implemented within section manager 1200, but section manager 1200 is instead one example of a system that may implement method 1500.

At block 1510, input module 1215 receives from a locality manager 110 target lateral flows 835 for two or more lanes 150 of a roadway 130 in a section 140 of the roadway 130. Embodiments of a locality manager 110 and the manner in which a locality manager 110 generates the lateral flows 835 (a subset, for a single section 140, of the target lateral flows 235 in FIG. 2) are discussed in detail above.

At block 1520, input module 1215 receives traffic state information 1240 from a plurality of connected vehicles 160 in the section 140 of the roadway 130. As discussed above, traffic state information 1240 can include position and velocity data for each ego connected vehicle 160 and leading and following vehicles in current and adjacent lanes 150. In some embodiments, the traffic state information 1240 can include information regarding spatial relationships (e.g., distances measured using onboard vehicle sensors) between the connected vehicles 160 in the applicable section 140 and other vehicles (connected or legacy) on the roadway 130.

At block 1530, lane assignment module 1220 processes the traffic state information 1240 and the target lateral flows 835 using a RL-based model 1300 to determine lane-change actions 1245 for the plurality of connected vehicles 160. As discussed above, the RL-based model 1300 is based on a single neural network 1400 with shared parameters for the plurality of connected vehicles 160. The RL-based model 1300 and the neural network 1400 that implements it are discussed in detail above. As discussed above, in some embodiments, the RL-based model 1300 is based on a MDP.

At block 1540, output module 1225 transmits the lane-change actions 1245 to the plurality of connected vehicles 160 via network 1260. The manner in which the lane-change actions 1245 are determined is discussed in detail above.

In some embodiments, method 1500 may include actions that are not shown in FIG. 15. For example, in some embodiments, lane assignment module 1220 employs a softmax algorithm to select from among left, right, and no-op lane-change actions 1245 for a given connected vehicle 160. As discussed above, in some embodiments, training module 1230 uses one or more of a Gumbel softmax algorithm, a cross-entropy loss function, gradient masking, imitation learning, and vehicle-placement randomization to improve the training of neural network 1400. As also discussed above, lane assignment module 1220 can repeat periodically, at a predetermined interval (e.g., every $\Delta t_{section}$ seconds), the RL-based process discussed above to convert target lateral flows 835 to specific lane-change actions 1245 for connected vehicles 160 and to transmit the lane-change actions 1245 to the connected vehicles 160.

CONCLUSION

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-15, but the embodiments are not limited to the illustrated structure or application.

The components described above can be realized in hardware or a combination of hardware and software and can be realized in a centralized fashion in one processing system or in a distributed fashion where different elements are spread across several interconnected processing systems. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

As used herein, "cause" or "causing" means to make, command, instruct, and/or enable an event or action to occur or at least be in a state where such event or action may occur, either in a direct or indirect manner.

Aspects herein can be embodied in other forms without departing from the spirit or essential attributes thereof. Accordingly, reference should be made to the following claims rather than to the foregoing specification, as indicating the scope hereof.

What is claimed is:

1. A system for traffic-flow regulation via centralized lateral flow control, the system comprising:
   a processor; and
   a memory storing machine-readable instructions that, when executed by the processor, cause the processor to:
   receive aggregated macroscopic traffic state information from a section manager that communicates with one or more connected vehicles in a section of a roadway;
   process the aggregated macroscopic traffic state information using a reinforcement-learning-based model to determine target lateral flows for two or more lanes of the roadway in the section of the roadway;
   transmit the target lateral flows to the section manager, wherein the section manager converts the target lateral flows to lane-change actions and transmits the lane-change actions to the one or more connected vehicles; and
   control at least one of the one or more connected vehicles in performing a lane-change action, of the lane-change actions.

2. The system of claim 1, wherein the machine-readable instructions to process the aggregated macroscopic traffic state information using the reinforcement-learning-based model to determine the target lateral flows include instructions that, when executed by the processor, cause the processor to output an attractiveness term and to compute the target lateral flow for a lane among the two or more lanes of the roadway from a minimum lateral flow, a maximum lateral flow, and the attractiveness term.

3. The system of claim 1, wherein the target lateral flow for a lane among the two or more lanes of the roadway is one of to the left and to the right.

4. The system of claim 1, wherein the reinforcement-learning-based model is based on a Markov Decision Process.

5. The system of claim 1, wherein a reward function used to train the reinforcement-learning-based model includes a societal-impact parameter that determines an extent to which the one or more connected vehicles are favored over legacy vehicles in achieving a predetermined traffic-flow objective.

6. The system of claim 5, wherein the predetermined traffic-flow objective is average speed.

7. The system of claim 1, wherein the machine-readable instructions include further instructions that, when executed by the processor, cause the processor to:
   serve a geographical area that includes at least one additional section of the roadway;
   process additional aggregated macroscopic traffic state information received from at least one additional section manager in the at least one additional section using the reinforcement-learning-based model to determine at least one additional target lateral flow for the two or more lanes in the at least one additional section; and
   transmit the at least one additional target lateral flow to the at least one additional section manager.

8. The system of claim 1, wherein the one or more connected vehicles are autonomous vehicles.

9. A non-transitory computer-readable medium for traffic-flow regulation via centralized lateral flow control and storing instructions that, when executed by a processor, cause the processor to:
   receive aggregated macroscopic traffic state information from a section manager that communicates with one or more connected vehicles in a section of a roadway;
   process the aggregated macroscopic traffic state information using a reinforcement-learning-based model to determine target lateral flows for two or more lanes of the roadway in the section of the roadway;
   transmit the target lateral flows to the section manager, wherein the section manager converts the target lateral flows to lane-change actions and transmits the lane-change actions to the one or more connected vehicles; and
   control at least one of the one or more connected vehicles in performing a lane-change action, of the lane-change actions.

10. The non-transitory computer-readable medium of claim 9, wherein the instructions to process the aggregated macroscopic traffic state information using the reinforcement-learning-based model to determine the target lateral flows include instructions that, when executed by the processor, cause the processor to output an attractiveness term and to compute the target lateral flow for a lane among the two or more lanes of the roadway from a minimum lateral flow, a maximum lateral flow, and the attractiveness term.

11. The non-transitory computer-readable medium of claim 9, wherein a reward function used to train the reinforcement-learning-based model includes a societal-impact parameter that determines an extent to which the one or more connected vehicles are favored over legacy vehicles in achieving a predetermined traffic-flow objective.

12. The non-transitory computer-readable medium of claim 9, wherein the instructions include further instructions that, when executed by the processor, cause the processor to:
   serve a geographical area that includes at least one additional section of the roadway;
   process additional aggregated macroscopic traffic state information received from at least one additional section manager in the at least one additional section using the reinforcement-learning-based model to determine at least one additional target lateral flow for the two or more lanes in the at least one additional section; and
   transmit the at least one additional target lateral flow to the at least one additional section manager.

13. A method, comprising:
   receiving, at a locality manager that regulates traffic flow on a roadway via lateral flow control, aggregated macroscopic traffic state information from a section manager that communicates with one or more connected vehicles in a section of the roadway;
   processing the aggregated macroscopic traffic state information at the locality manager using a reinforcement-learning-based model to determine target lateral flows for two or more lanes of the roadway in the section of the roadway;
   transmitting the target lateral flows from the locality manager to the section manager, wherein the section manager converts the target lateral flows to lane-change actions and transmits the lane-change actions to the one or more connected vehicles; and controlling at least one of the one or more connected vehicles in performing a lane-change action, of the lane-change actions.

14. The method of claim 13, wherein the reinforcement-learning-based model outputs an attractiveness term and the target lateral flow for a lane among the two or more lanes of the roadway is computed from a minimum lateral flow, a maximum lateral flow, and the attractiveness term.

15. The method of claim 13, wherein the target lateral flow for a lane among the two or more lanes of the roadway is one of to the left and to the right.

16. The method of claim 13, wherein the reinforcement-learning-based model is based on a Markov Decision Process.

17. The method of claim 13, wherein a reward function used to train the reinforcement-learning-based model includes a societal-impact parameter that determines an extent to which the one or more connected vehicles are favored over legacy vehicles in achieving a predetermined traffic-flow objective.

18. The method of claim 17, wherein the predetermined traffic-flow objective is average speed.

19. The method of claim 13, wherein the locality manager:

serves a geographical area that includes at least one additional section of the roadway;

processes additional aggregated macroscopic traffic state information received from at least one additional section manager in the at least one additional section using the reinforcement-learning-based model to determine at least one additional target lateral flow for the two or more lanes in the at least one additional section; and transmits the at least one additional target lateral flow to the at least one additional section manager.

20. The method of claim 13, wherein the one or more connected vehicles are autonomous vehicles.

* * * * *